(12) United States Patent
Vrzic et al.

(10) Patent No.: US 9,461,800 B2
(45) Date of Patent: Oct. 4, 2016

(54) RETRANSMITTING COMMUNICATIONS IN A MOBILE NETWORK USING SMALL CELL CLUSTERS

(71) Applicant: BlackBerry Limited, Waterloo (CA)

(72) Inventors: Sophie Vrzic, Kanata (CA); Yongkang Jia, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 117 days.

(21) Appl. No.: 14/038,481

(22) Filed: Sep. 26, 2013

(65) Prior Publication Data

US 2015/0085680 A1    Mar. 26, 2015

(51) Int. Cl.
*H04J 1/16* (2006.01)
*H04L 5/00* (2006.01)
*H04W 84/04* (2009.01)
*H04W 24/02* (2009.01)
*H04W 88/04* (2009.01)

(52) U.S. Cl.
CPC .......... *H04L 5/0055* (2013.01); *H04W 84/045* (2013.01); *H04W 24/02* (2013.01); *H04W 88/04* (2013.01)

(58) Field of Classification Search
CPC   H04L 5/0055;  H04W 84/045;  H04W 24/02; H04W 88/04
USPC ........................................................ 370/252
See application file for complete search history.

(56) References Cited

U.S. PATENT DOCUMENTS

| | | | | |
|---|---|---|---|---|
| 2009/0312027 A1* | 12/2009 | Foschini | ............... | H04W 24/02 455/446 |
| 2010/0097978 A1* | 4/2010 | Palanki | ................ | H04L 1/1867 370/315 |
| 2010/0208685 A1* | 8/2010 | Kim | ..................... | H04W 52/245 370/329 |
| 2010/0246544 A1* | 9/2010 | Brisebois | .............. | H04W 24/00 370/338 |
| 2010/0322328 A1* | 12/2010 | Schirmacher | ........ | H04B 7/0404 375/260 |
| 2012/0002593 A1* | 1/2012 | Kim | ...................... | H04L 1/1854 370/315 |
| 2012/0225680 A1* | 9/2012 | Suh | ....................... | H04W 16/32 455/501 |
| 2013/0114561 A1* | 5/2013 | Simonsson | ............ | H04B 7/022 370/329 |

(Continued)

FOREIGN PATENT DOCUMENTS

| | | |
|---|---|---|
| WO | 2011019924 | 2/2011 |
| WO | 2012024346 | 2/2012 |

OTHER PUBLICATIONS

International Searching Authority, "International Search Report & Written Opinion", issued in connection with International Application No. PCT/CA2014/050913, dated Oct. 29, 2014 (9 pages).

(Continued)

*Primary Examiner* — Faisal Choudhury
(74) *Attorney, Agent, or Firm* — Fish & Richardson P.C.

(57) ABSTRACT

Methods, apparatus and articles of manufacture to enable retransmitting of communications in a mobile network using small cell clusters are disclosed. Example methods disclosed herein for a macro node in a mobile network include configuring a cluster of small cell nodes in communication with the macro node to perform retransmission of downlink packets sent from the macro node to a first user equipment (UE) served by the macro node. Such example methods also include sending a first downlink packet from the macro node for receipt by the first UE. Such example methods further include receiving acknowledgment information for the first downlink packet from the cluster of small cell nodes.

22 Claims, 14 Drawing Sheets

(56) References Cited

U.S. PATENT DOCUMENTS

| | | | |
|---|---|---|---|
| 2013/0201966 A1* | 8/2013 | Weng | H04W 72/04 370/336 |
| 2013/0242854 A1 | 9/2013 | Cai et al. | |
| 2013/0322235 A1* | 12/2013 | Khoryaev | H04W 24/10 370/229 |
| 2015/0003406 A1* | 1/2015 | Athley | H04B 7/0617 370/330 |

OTHER PUBLICATIONS

"3rd Generation Partnership Project; Technical Specification Group Radio Access Network; Coordinated multi-point operation for LTE physical layer aspects (Release 11)," 3GPP TR 36.819, V11.2.0, Technical Report, Sep. 2013, 70 pages.

International Preliminary Report on Patentability in International Application No. PCT/CA2014/050913, dated Apr. 7, 2016.

* cited by examiner

RETRANSMITTING COMMUNICATIONS IN A MOBILE NETWORK USING SMALL CELL CLUSTERS

FIELD OF THE DISCLOSURE

This disclosure relates generally to mobile networks and, more particularly, to retransmitting communications in a mobile network using small cell clusters.

BACKGROUND

In Third Generation Partnership Project (3GPP) long term evolution (LTE) mobile networks, small cell nodes can be deployed within the coverage area of a macro evolved Node B (eNB). In such deployment scenarios, the macro eNB can implement a macro cell with a wide coverage area, and the small cell nodes typically implement respective small cells to provide enhanced coverage, special services, etc., to one or more user equipment (UE) at respective locations within the macro cell. In some scenarios, the macro eNB and the small cell nodes may share resources, such as one or more component carriers, allocated to a network operator.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
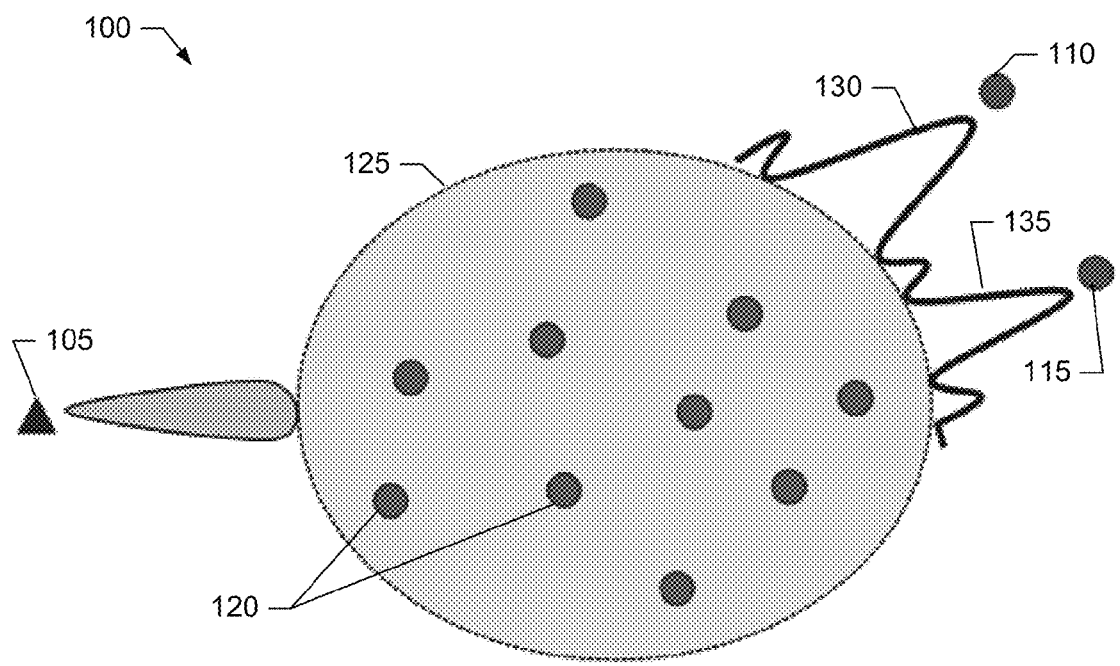
FIG. 1 is a block diagram of an example mobile network capable of retransmitting communications using small cell clusters, as disclosed herein.

Example methods, apparatus and articles of manufacture (e.g., storage media) to enable retransmitting of communications in a mobile network using small cell clusters are disclosed herein. Example methods disclosed herein for a macro node (e.g., a macro eNB) in a mobile network can include configuring a cluster of small cell nodes in communication with the macro node to perform retransmission of downlink packets sent from the macro node to a first UE served by the macro node. Such disclosed example methods can also include sending a first downlink packet from the macro node for receipt by the first UE. Such disclosed example methods can further include receiving acknowledgment information for the first downlink packet from the cluster of small cell nodes.

Furthermore, some such example methods can include (1) determining a first channel quality metric characterizing channel quality between the macro node and a first one of the small cell nodes based on first channel quality information received from the first one of the small cell nodes, (2) determining a second channel quality metric characterizing channel quality between the first one of the small cell nodes and the first UE based on second channel quality information received from the UE, and (3) determining whether to include the first one of the small cell nodes in the cluster of small cell nodes based on comparing the first channel quality metric to a first threshold and comparing the second channel quality metric to a second threshold.

Additionally or alternatively, some such example methods further include, in response to receiving a negative acknowledgment for the first downlink packet from the first UE, scheduling the cluster of small cell nodes to retransmit the first downlink packet to the first UE.

Additionally or alternatively, some such example methods further include (1) determining first channel quality metrics characterizing channel quality between the macro node and respective ones of the cluster of small cell nodes based on first channel quality information received from the cluster of small cell nodes, (2) determining second channel quality metrics characterizing channel quality between respective ones of the cluster of small cell nodes and the first UE based on second channel quality information received from the UE, and (3) based on the first channel quality metrics and the second channel quality metrics, (i) selecting a first modulation and coding scheme (MCS) for downlink communication from the macro node to the cluster of small cell nodes, and (ii) selecting a second MCS for downlink communication from the cluster of small cell nodes to the first UE. In some such examples, selecting the first MCS for downlink communication from the macro node to the cluster of small cell nodes is further based on (1) using the first channel quality metrics to determine a probability that a first number of small cell nodes will receive downlink packets sent from the macro node using the first MCS, and selecting the first MCS for downlink communication from the macro node to the cluster of small cell nodes in response to determining that the probability at least meets a threshold.

In some such example methods, configuring the cluster of small cell nodes includes determining a channel condition associated with the first UE, and specifying, based on the channel condition, whether the cluster of small cell nodes is to perform distributed beamforming retransmission of the downlink packets or single frequency network retransmission of the downlink packets.

Additionally or alternatively, some such disclosed example methods further include (1) configuring a second cluster of small cell nodes in communication with the macro node to perform retransmission of uplink packets sent from the first UE to the macro node, (2) in response to determining that a first uplink packet sent from the first UE for receipt by the macro node has not been received, sending a negative acknowledgment for the first uplink packet to the second cluster of small cell nodes, and (3) receiving the first uplink packet from the second cluster of small cell nodes. Some such example methods further include (i) determining a first channel quality metric characterizing channel quality between the first UE and a first one of the small cell nodes based on first channel quality information received from the first one of the small cell nodes, and (ii) determining whether to include the first one of the small cell nodes in the second cluster of small cell nodes based on comparing the first channel quality metric to a first threshold. Additionally or alternatively, some such example methods further include configuring the first UE to send the uplink data packets, including the first uplink data packet, to the second cluster of small cell nodes. Also, some such example methods can further include determining a power control offset to be used by the UE when sending the first uplink packet to the second cluster of small cell nodes, and sending the power control offset to the first UE.

Example methods disclosed herein for a small cell node in a mobile network can include receiving information to configure the small cell node to perform retransmission of downlink packets sent from a macro node (e.g., a macro eNB) in the mobile network to a first UE served by the macro node. Such disclosed example methods can also include detecting a first downlink packet sent from the macro node for receipt by the first UE and, in response to receiving a negative acknowledgment for the first downlink packet from the first UE, retransmitting the first downlink packet to the first UE.

Additionally, some such example methods further include receiving second information from the macro node to schedule retransmission of the first downlink packet to the first UE. However, in other examples, the small cell node is to retransmit the first downlink packet to the first UE without being scheduled by the macro node.

Additionally or alternatively, some such methods further include receiving a positive acknowledgment for the first downlink packet from the first UE in response to retransmitting the first downlink packet to the first UE, and sending the positive acknowledgment to the macro node.

Additionally or alternatively, some such methods further include determining a channel condition associated with the first UE, and determining, based on the channel condition, a beamforming weight to be used when retransmitting the first downlink packet to the first UE.

Additionally or alternatively, some such methods further include (1) receiving second information to configure the small cell node to perform retransmission of uplink packets sent from the first UE to the macro node, (2) detecting a first uplink packet sent by the first UE to the macro node, and (3) in response to receiving a negative acknowledgment for the first uplink packet from the macro node, retransmitting the first uplink packet to the macro node. Some such example methods further include sending a first positive acknowledgment for the first uplink packet to the first UE in response to detecting the first uplink packet and before receiving a second positive acknowledgment for the first uplink packet from the macro node.

Example methods disclosed herein for a UE in a mobile network include receiving information from a macro node (e.g., a macro eNB) specifying a cluster of small cell nodes to perform retransmission of downlink packets sent from the macro node to the UE. Such example methods can also include, in response to determining that a first downlink packet sent from the macro node for receipt by the UE has not been received, sending a negative acknowledgment for the first downlink packet to the cluster of small cell nodes. Such example methods can further include receiving the first downlink packet from the cluster of small cell nodes.

Additionally, some such example methods include, in response to receiving the first downlink packet from the cluster of small cell nodes, sending a positive acknowledgment for the first downlink packet to the cluster of small cell nodes.

Additionally or alternatively, some such example methods include (1) receiving second information from the macro node specifying a second cluster of small cell nodes to perform retransmission of uplink packets sent from the UE to the macro node, (2) sending a first uplink packet from the UE to the macro node, and (3) receiving acknowledgment information for the first uplink packet from the cluster of small cell nodes. Some such example methods further include receiving third information to configure the UE to send the uplink data packets, including the first uplink data packet, to the second cluster of small cell nodes. Some such example methods further include receiving a power control offset to be used when sending the first uplink packet to the second cluster of small cell nodes.

These and other example methods, apparatus, systems and articles of manufacture (e.g., physical storage media) to implement retransmission of communications in a mobile network using small cell clusters are disclosed in further detail below.

As noted above, in LTE mobile networks, small cell nodes can be deployed within the coverage area of a macro eNB to provide small cell coverage areas within the macro cell implemented by the eNB. In accordance with the examples disclosed herein, a cluster of small cell nodes can be treated as a secondary system operating within a coverage area allocated to a primary system, which corresponds to the macro eNB. In cognitive radio systems, a secondary system can employ spectrum sharing and interference minimization techniques to opportunistically use white space within a band allocated to a primary system. Example methods, apparatus and articles of manufacture (e.g., storage media) disclosed herein implement retransmission schemes, which can take advantage of idle small cell nodes and white space made available in the macrocell, to improve system capacity, system coverage, UE battery consumption, etc.

Turning to the figures, a block diagram of an example mobile network 100 capable of retransmitting communications using small cell clusters as disclosed herein is illustrated in FIG. 1. The mobile network 100 of the illustrated example, which may be an example LTE mobile network 100, includes an example macro node 105, such as an example macro eNB 105, implementing a macro cell having a large coverage area to serve one or more UEs, such as the example UEs 110 and 115 illustrated in FIG. 1. The example mobile network 100 also includes one or more example small cell nodes (collectively represented in FIG. 1 using the reference numeral 120). The small cell nodes 120 of the illustrated example may implement respective small cells to provide enhanced coverage, special services, etc., to UEs, such as the UEs 110 and 115, in the coverage area of the macro eNB 105. Additionally, as disclosed in further detail below, the small cell nodes 120 can be configured to form a small cell cluster to retransmit communications between the macro eNB 105 and one or more of the UEs 110 and 115.

For example, groups of the small cell nodes 120 can form one or more small cell clusters, such as the example small cell cluster 125 illustrated in FIG. 1, to retransmit packets sent between the macro eNB 105 and the UE 110 and/or between the macro eNB 105 and the UE 115. In some examples, the small cell cluster 125 employs distributed beamforming and/or single frequency network (SFN) techniques to retransmit packets. For example, in the case of downlink distributed beamforming, a cluster, such as the cluster 125, can form multiple main beams, such as the example beams 130 and 135, to different UEs, such as the UEs 110 and 115, that are at the cell edge or outside the coverage area of the macro eNB 105. Distributed beamforming may also be used when the destination UEs are within the coverage area of the macro eNB 105, but are not within the coverage area of an individual small cell node 120 so that a group of small cells 120 can serve the UE.

In some examples of downlink distributed beamforming, a cluster of small cell nodes 120 that are closest to a distant UE, such as the UE 110, are used to form a relay network. Using beamforming, the small cell nodes in the cluster forward downlink packets (or, or generally, any type of downlink signal/communication) from the macro eNB 105 to the distant UE 110. The small cell nodes 120 in the cluster constructively form a spatial beam pattern 130 that directs the main beam toward the intended UE 110. Because the energy is focused in the direction of the intended UE 110, the same resources (e.g., in frequency and/or time) can potentially be reused by the macro eNB 105 for low power transmission to other nearby UEs. Additionally or alternatively, these same resources may be allocated to different distant UEs, such as the UE 115, if the UEs are far enough apart.

In the example of FIG. 1, it is assumed that the small cell nodes 120 are located in the x-y plane within the coverage area of the macro eNB 105. It is also assumed that the small cell nodes 120 have one or more isotropic antennas and transmit similar or identical energies. However, the retransmission solutions based on small cell clusters disclosed herein are readily applicable to three (3) dimensional deployment scenarios and/or with small cell nodes 120 having multiple and/or directional antennas. Also, to perform distributed beamforming, the cluster of small cell nodes 120 that are used as relay (or retransmission) nodes can be synchronized through any appropriate closed-loop or open-loop approach.

Retransmission of communications using small cell clusters, as disclosed herein, can solve the problem of how to increase downlink (DL) and/or uplink (UL) coverage and/or capacity in a mobile network, such as an LTE-A network. Example disclosed solutions can take advantage of white space that is created when a number of small cell nodes with reduced transmit power/coverage are deployed within the coverage area of a macro eNB. Example disclosed solutions set forth how a cluster of small cell nodes, such as the nodes 120, can be used opportunistically to assist a macro node, such as the macro eNB 105, in DL/UL transmissions to/from a distant UE, such as the UEs 110 and/or 115. Example opportunistic transmission techniques employed in these disclosed solutions include distributed beamforming and SFN transmission.

For example, a first example solution disclosed in further detail below describes how a small cell cluster can be used as a relay network in order to assist in DL retransmissions to a distant UE. The cluster can use, for example, distributed beamforming or SFN retransmission. A macro eNB procedure that opportunistically uses the cluster nodes is also described. The new transmission scheme can improve coverage and/or reduce the transmit power required to reach a distant UE, which can provide a green communication system.

A second example solution disclosed in further detail below describes how a small cell cluster can be used to assist UL transmission. According to this second example solution, small cell nodes can retransmit packets received from a UE to a macro eNB. In some examples, the small cell nodes in the UE's UL cluster can use distributed beamforming to retransmit data to the macro eNB. This can improve coverage and capacity, while reducing the battery consumption for the UE.

A third example solution disclosed in further detail below describes how one or more DL and/or UL small cell cluster sets can be defined for a UE to support retransmission between a macro eNB and the UE.

The example UEs 110 and 115 of FIG. 1 can be implemented by any types and/or combination of user devices, mobile stations, user endpoint equipment, etc., such as smartphones, mobile telephone devices that are portable, mobile telephone devices implementing stationary telephones, personal digital assistants (PDAs), etc., or, for example, any other types of UE devices, or combinations thereof. Also, one or more of the UEs 110-115 may correspond to other types of devices capable of operating in the mobile network 100. For examples, one or more of the UEs 110-115 may correspond to a relay node, a small cell (e.g., in a cell cluster), a micro/pico/femto cell, etc. The example small cell nodes 120 of FIG. 1 can be implemented by any type(s) or number of network nodes, such as relay nodes, micro/pico/femto cells, etc.

Furthermore, although one eNB 105, two UEs 110-115 and ten (10) small cell nodes 120 are illustrated in FIG. 1, the example mobile network 100 can support any number and/or type(s) of eNBs, UEs and/or small cell nodes. Also, the example methods, apparatus, articles of manufacture and systems disclosed herein for retransmitting communications using small cell clusters are not limited to implementation in an LTE system, but can be applied in any system supporting the relay of information among network elements (e.g., such as network nodes, user devices, etc.).

Turning to the first example solution disclosed herein for performing downlink retransmission using a small cell cluster, a technique to increase capacity in an LTE network, such as the network 100, is to increase the number of small cell nodes 120 in the network 100 and to reduce the coverage area of each small cell node 120. Then, several small cell nodes 120 may be deployed within the coverage area of the macro eNB 105. In some examples, the small cell nodes 120 can be allocated a separate carrier for operation than that used by the macro eNB. UEs, such as the UEs 110 and/or 115, that are within the coverage area of both the macro eNB 105 and a small cell node 120 may be connected to both nodes.

White space corresponds to radio resources that are allocated but not being used to support active communications. For example, white space can correspond to radio spectrum in a mobile network in which the measured interference is below a defined threshold. The white space (in terms of frequency/spectral band) that is available for reuse can be different for different locations. Network nodes that do not have all carriers activated may have white space on some of the carriers. By increasing the number of small cell nodes 120 and decreasing the coverage area of each small cell node 120, more white space can be created, since the number of UEs served by each node decreases. This behavior is illustrated in the examples if FIGS. 2 and 3.

Figure 2:
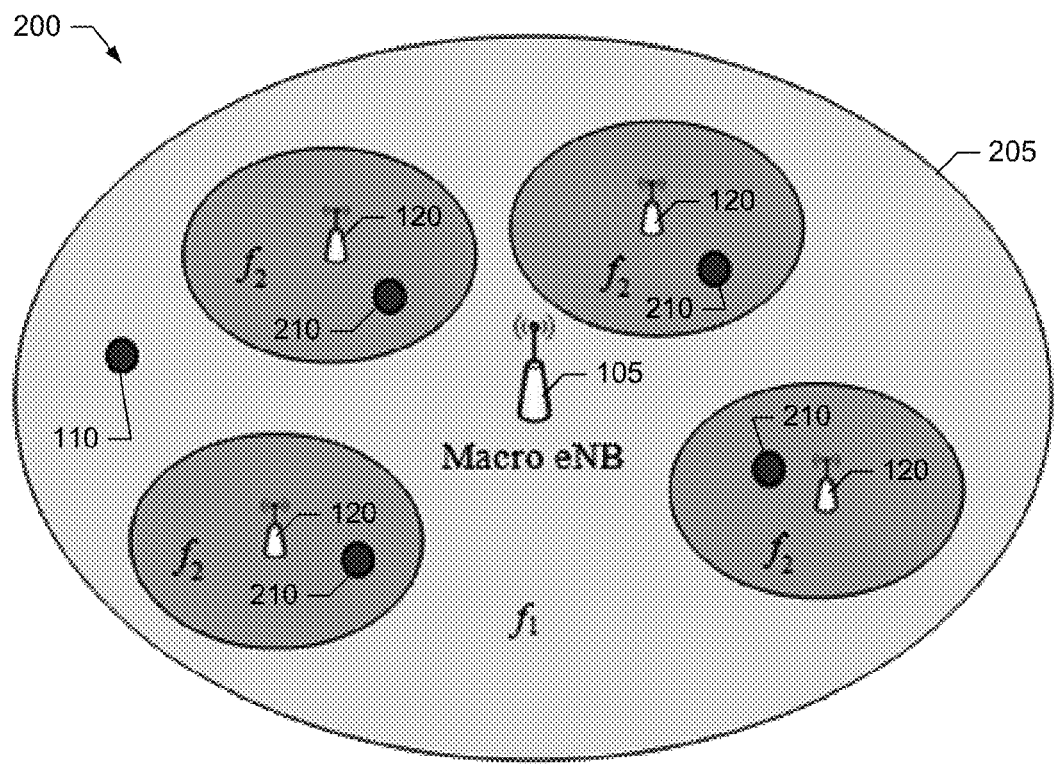
FIG. 2 is a block diagram of an example operating scenario in which no white space is available in the mobile network of FIG. 1.

FIG. 2 illustrates an example operating scenario 200 in which no white space is available in the example mobile network 100 of FIG. 1. In the example scenario 200 of FIG. 2, there are relatively few small cell nodes 120 that operate at relatively high power within an example macro coverage area 205 of the macro eNB 105. As shown in the illustrated example, all of the available small cell resources are being used to support the UEs (collectively represented in FIG. 2 using the reference numeral 210) within the macro coverage area 205. Accordingly, there is no available white space that can be reused to form a cluster of small cell nodes to serve the UE 110 illustrated in FIG. 2.

Figure 3:
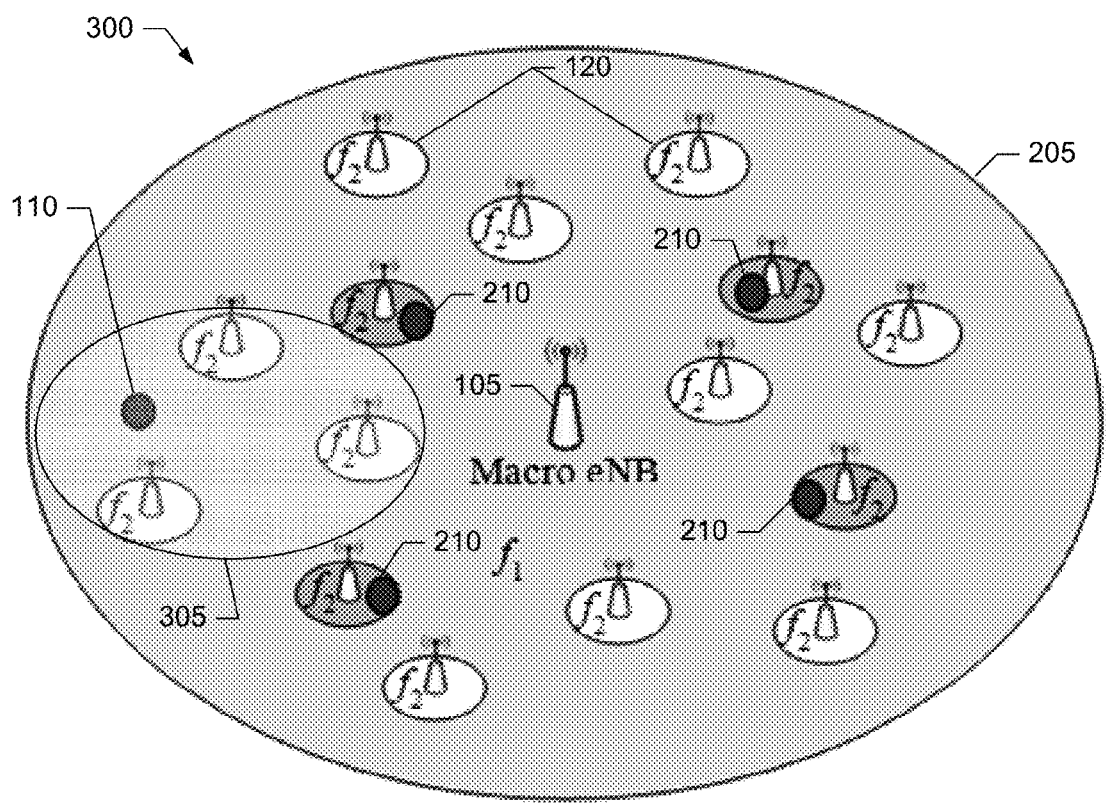
FIG. 3 is a block diagram of an example operating scenario in which white space is available in the mobile network of FIG. 1.

Conversely, FIG. 3 illustrates an example operating scenario 300 in which white space is available in the example mobile network 100 of FIG. 1. As compared to the example scenario 200 of FIG. 2, in the example scenario 300 of FIG. 3, relatively more small cell nodes 120 that operate at relatively lower power are included within the macro coverage area 205 of the macro eNB 105. As shown in the illustrated example of FIG. 3, a few of the small cell nodes 120 are in use to support the UEs 210 within the macro coverage area 205, leaving several of the remaining small cell nodes 120 with unused resources. The unused resources of the these small cell nodes 120 correspond to white space that can be reused to form a cluster of small cell nodes, such as an example cluster 305, to serve the UE 110 of the illustrated example.

As illustrated by the example operating scenarios 200 and 300 of FIGS. 2 and 3, than remaining unused, white space created by, for example, increasing the number of small cell nodes 120 and decreasing the coverage area of each small cell node 120 can be used to form a relay network or, in other words, as small cell cluster that can relay (e.g., retransmit) packets from the macro eNB 105 to distant UEs, such as the UEs 110 and/or 115. Additionally or alternatively, such white space can be used to form a small cell cluster to relay (e.g., retransmit) packets from distant UEs, such as the UEs 110 and/or 115, to the macro eNB 105, which can enable the transmission power of the distant UE to be reduced and, as a result, improve the UE's battery performance. For example, in the operating scenario 300 of FIG. 3, the small cell cluster 305 is formed to serve the UE 110 with any available frequency, such as, for example, the frequency $f_2$ depicted in FIG. 3.

Figure 4A:
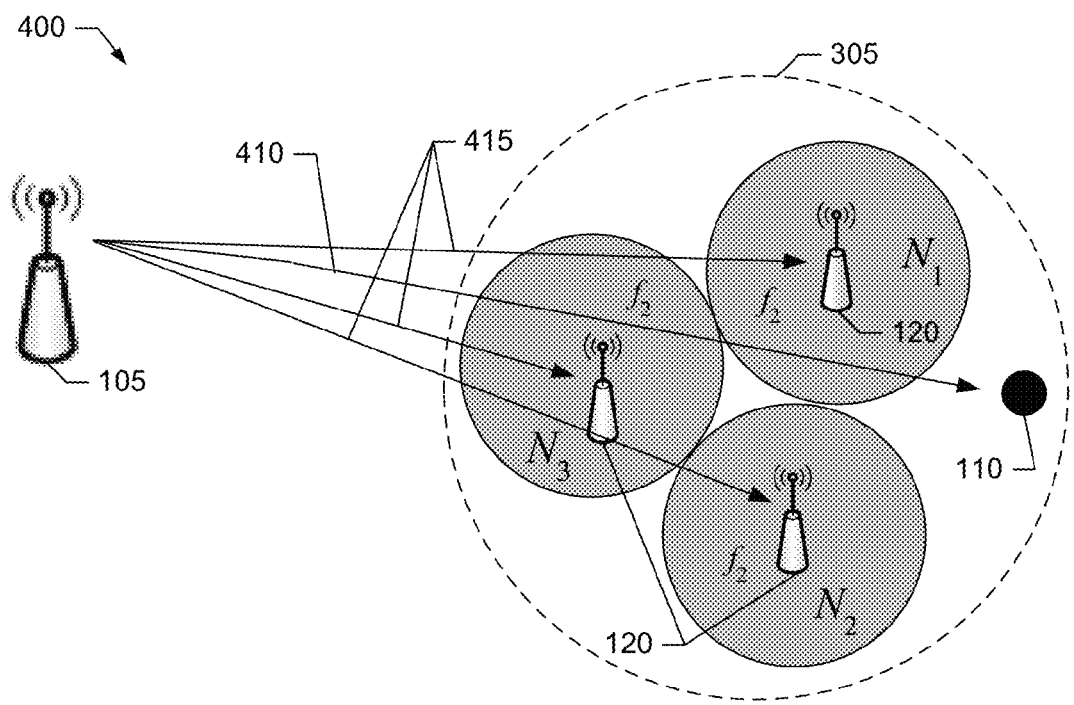
FIGS. 4A-B are block diagrams illustrating an example operation of the mobile network of FIG. 1 to retransmit downlink data using small cell clusters, as disclosed herein.
Figure 4B:
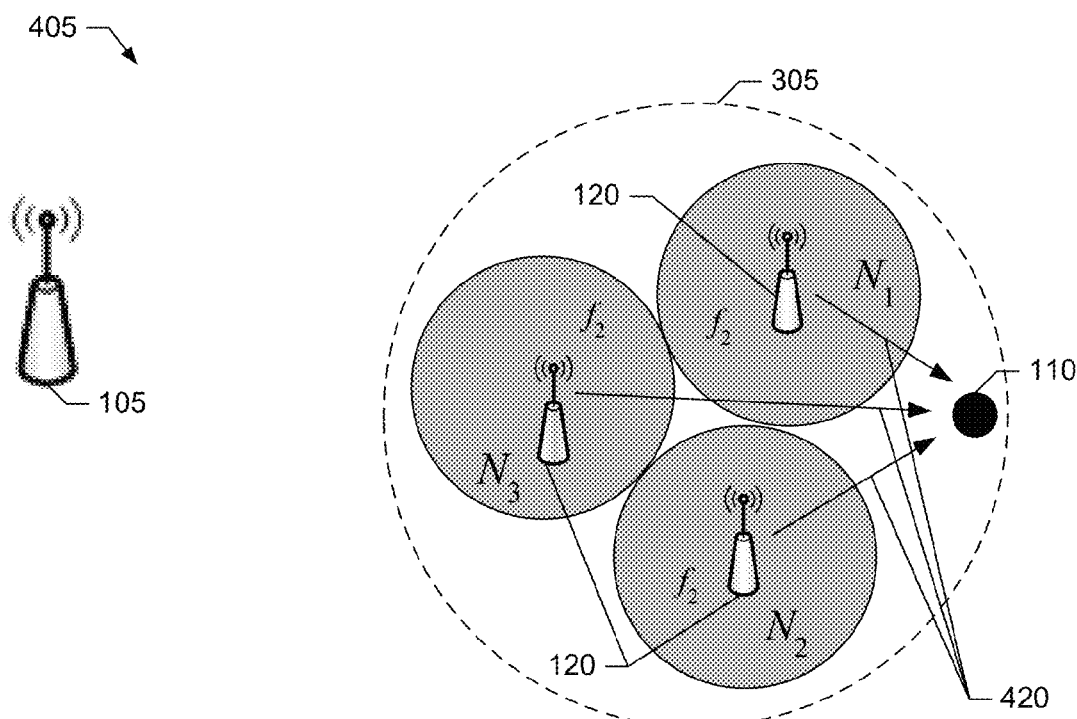

FIGS. 4A-B illustrate an example sequence of operations 400 and 405 in which an example small cell cluster, such as the small cell cluster 305, can be used to assist in retransmissions to a distant UE, such as the UE 110, that is served by a macro eNB, such as the macro eNB 105. In some examples, retransmissions occur according to an acknowledgment procedure, such as a hybrid automatic repeat request (HARQ) procedure, in which a receiver is to acknowledge receipt of incoming data packets from a transmitter with, for example, a positive acknowledgment (ACK) if the incoming packet is received correctly, or a negative acknowledgment (NACK) if the incoming packet is determined to have not been received (e.g., based on detecting a skipped sequence number) or is received incorrectly (e.g., due to a number or errors in the received packet). If the receiver sends a NACK for an incoming data packet, that packet is to be retransmitted to the receiver. In the illustrated examples, the retransmissions can be sent on the same carrier as the first transmission or can be sent on a different carrier depending on, for example, a carrier's availability for reuse. Also, in some examples, the small cells nodes 120 in the small cell cluster 305 do not need to know the security configurations of the target UE 110 because the downlink packets (e.g., transport blocks) to be retransmitted have already been encrypted and/or integrity protected by the macro eNB 105, and the small cells nodes 120 will just retransmit the already encrypted and/or integrity protected downlink packets.

Figure 5:
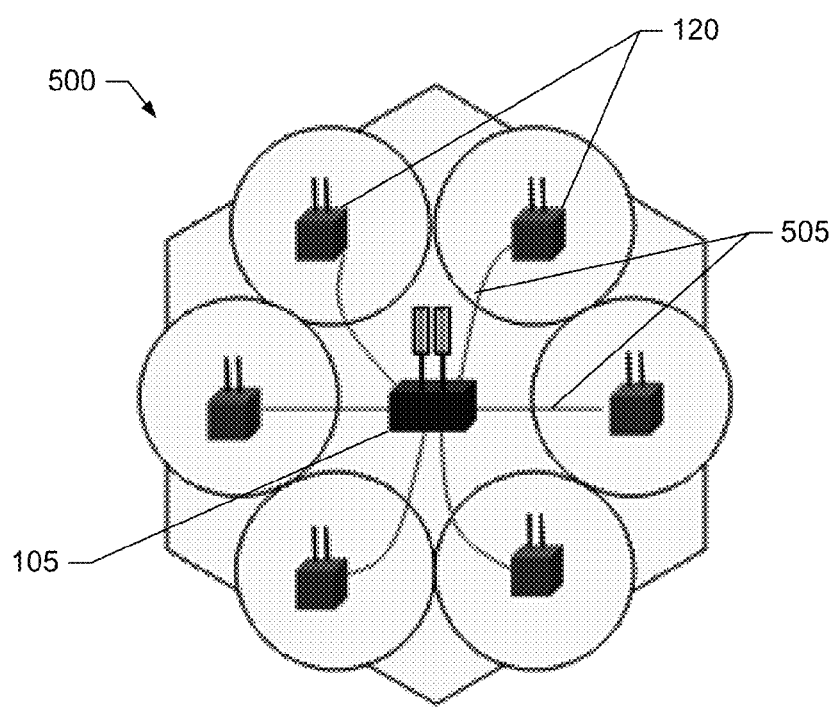
FIG. 5 is a block diagram illustrating example connections between example small cell nodes and an example macro eNB in the mobile network of FIG. 1.

In some examples, along with performing later retransmission of an initial downlink packet sent from the macro eNB 105 to the target UE 110, the small cell cluster 305 can also transmit the initial downlink packet to the target UE 110 in addition to, or as an alternative to, the macro eNB 105 sending the initial downlink packet to the target UE 110. In such examples, the information (e.g., data) to be sent to the UE 110 may be provided by the macro eNB 105 to the small cell nodes 120 of the cluster 305 via wireless or wireline backhaul communication links prior to transmission to the UE 110. FIG. 5 illustrates an example backhaul network 500 connecting the macro eNB 105 to the small cell nodes 120 of the mobile network 100 of FIG. 1. In the illustrated example of FIG. 5, the macro eNB 105 and the small cell nodes 120 are interconnected by any number and/or type(s) communication links 505, such as one or more optical fiber links, microwave links, etc.

Returning to FIGS. 4A-B, during the first example operation 400, an initial transmission 410 of a downlink packet is sent by the macro eNB 105 to the target UE 110. Initial transmissions (collectively represented by the reference numeral 415 in FIG. 4A) of the downlink packet are also sent by the macro eNB 105 to the small cell nodes 120 of the small cell cluster 305. During the subsequent second example operation 405, retransmissions (collectively represented by the reference numeral 420 in FIG. 4B) of the downlink packet are sent by the small cell cluster 305 to the target UE 110 if, for example, the small cell cluster 305 determines (e.g., by detecting a negative acknowledgment from the UE 110) that the UE 110 did not receive the initial downlink packet transmission 410.

In some examples, although the retransmissions 420 are sent by the nodes 120 in the UE's small cell cluster 305, the macro eNB 105 can schedule the retransmissions 420 in order to, for example, coordinate distributed beamforming transmission from the small cell cluster 305 to the UE 110. Additionally or alternatively, in some examples, if the small cell cluster 305 uses a decode-and-forward retransmission scheme, and if acknowledgment information is also sent from the small cell cluster 305 to the macro eNB 105, then the macro eNB 105 can decide how the retransmissions 420 are to be sent. For example, if enough of the small cell nodes 120 in the cluster 305 send a positive acknowledgment (ACK) in response to receiving the initial transmission 150, then distributed beamforming can be used for the retransmissions 420. However, if no small cell node 120 or only a few of the nodes 120 in the cluster 305 received the initial downlink packet correctly, then an alternative approach may be employed. An example of such an alternative approach may be to send the packet on a carrier that is within the UE's DL cluster 305 or the macro eNB 105 can retransmit the packet.

In some examples, to transmit a downlink packet using distributed beamforming, a time division duplex (TDD) carrier could be allocated to the small cell cluster 305 and to the UE 110. With uplink-downlink reciprocity on this TDD carrier, by measuring an uplink signal sent by the UE 110, such as the sounding reference signal (SRS) used in LTE, the small cell nodes 120 in the cluster 305 can estimate downlink channel state information, such as the phase offset(s), path loss(es), etc., associated with the downlink channels from the small cell nodes 120 to the UE 110. If respective ones of the small cell nodes 120 within the cluster 305 retransmit the downlink packet with the reversed phase offset measured for their respective downlink channels to the UE 110, then the individually transmitted signals from the small cell nodes 120 can be constructively combined at the receiver of the UE 110.

The probability that all N small cell nodes 120 in the cluster 305 receive the initial downlink packet correctly from the macro eNB 105, and the UE 110 correctly receives the packet from the cluster 305 when distributed beamforming is used, is given by Equation 1:

$$p_i = \left[\prod_{j=1}^{N}(1 - F(MCS_m, SINR_j^{(m)}))\right] \left(1 - G_C(MCS_C, SINR_i^{(C)})\right). \quad \text{Equation 1}$$

In Equation 1, $MCS_m$ is the modulation and coding scheme (MCS) used by the macro eNB (e.g., the macro eNB 105) for the initial transmission targeted to the cluster (e.g., the cluster 305), $SINR_j^{(m)}$ is the received SINR from the macro eNB to the respective small cell node j of the cluster, $MCS_C$ is the MCS used by the cluster for retransmissions to the $i^{th}$ UE (e.g., the UE 110), and $SINR_i^{(C)}$ is the received SINR from the cluster to the $i^{th}$ UE. The function F( ) is a function of the frame error rate, which is dependent on the values of $MCS_m$ and $SINR_j^{(m)}$ for the macro-small cell node link, and the $G_C( )$ is a function of the frame error rate, which is based on the values of $MCS_C$ and $SINR_i^{(C)}$, for distributed beamforming from the cluster to the UE. The parameter N represents the number of small cell nodes that are participating in the retransmission. The value of N depends on the condition of the links between the small cell node and the macro cell eNB, and the MCS that the macro eNB uses to send the first packet to the cluster. The number N is smaller than or equal to the number of small cell nodes in the UE's cluster. In general, as the MCS decreases, the number of nodes that receive the packet correctly and, thus, that could potentially participate in the re-transmission increases. As the parameter N increases, the signal-to-interference-and-noise (SINR) for the distributed beamforming transmission increases.

When the packet is transmitted from the cluster using distributed beamforming, the SINR for the combination of retransmitted packets received by the UE from the small cell nodes of the cluster is given by Equation 2:

$$SINR_i^{(C)} = \frac{\left|\sum_{j \in C} h_{ji} w_{ji}^H P_{ji}^{1/2}\right|^2}{I + \sigma_n^2}. \quad \text{Equation 2}$$

In Equation 2, $h_{ji}$ is the channel gain from the small cell node j to UE i, $w_{ji}$ is the beamforming weights for small cell node j to UE i, $P_{ji}$ is the transmit power for the small cell node j transmitting to the UE i, I corresponds to the interference power, and $\sigma_n^2$ corresponds to the noise power. The variables $h_{ji}$ and $w_{ji}$ can be vectors if the small cell nodes have multiple antennas. The beamforming weights may be set for each small cell node j based on the downlink channel state information, such as the phase offset, path loss, etc., determined by each small cell node j.

Assuming the UE received the initial transmission from the macro eNB and the multiple retransmissions from the relay cluster, the SINR at the UE, if coherent soft combining for different transmission attempts is used, is given by Equation 3:

$$SINR_i = SINR_i^{(m)} + \sum_{k=1}^{K} SINR_{i,k}^{(C)}. \quad \text{Equation 3}$$

In Equation 3, .K is the maximum number of retransmissions, and the UE is assumed to perform soft-combining of the initial packet transmission and subsequent, different retransmissions. The SINR values in Equation 3 are in linear domain.

The SINR at the UE for the first transmission attempt by the macro eNB is given by Equation 4:

$$SINR_i^{(m)} = \frac{|h_{m,i} w_{m,i}^H|^2 P_{m,i}}{I + \sigma_n^2}. \quad \text{Equation 4}$$

In Equation 4, $h_{mi}$ is the channel gain from the macro node to UE i, $w_{mi}$ is the beamforming weights for the macro node to UE i, $P_{mi}$ is the transmit power for the macro node transmitting to the UE i, I corresponds to the interference power, and $\sigma_n^2$ corresponds to the noise power. To achieve a target frame error rate (FER), the UE's SINR should satisfy the following constraint of Equation 5:

$$SINR_i > SINR_{target}. \quad \text{Equation 5}$$

If $SINR_i$ for the UE (i) is below the target $SINR_{target}$, then the difference can be accounted for by retransmissions from the cluster.

For example, the difference in the target SINR and the SINR after the first transmission is given by Equation 6:

$$\Delta SINR_i = SINR_{target} - SINR_i^{(m)}. \quad \text{Equation 6}$$

The SINR from the cluster to the UE is determined by the number of nodes that received the original packet correctly and that participate in the retransmissions. To achieve an SINR from the cluster that makes up for the difference given by Equation 6, the number of small cell nodes that are needed to participate in distributed beamforming, assuming the signal strength to the UE from the different nodes is approximately the same and there are a total k retransmission by the small cell nodes, is given by Equation 7:

$$n_s = \left[\frac{\Delta SINR}{E_j(SINR_i^{(j)})k}\right]^{1/2}. \quad \text{Equation 7}$$

In Equation 7, $E_j$ ($SINR_i^{(j)}$) is an average of $SINR_i^{(j)}$ over all small cells j which participate in distributed beamforming retransmission. By assuming that the success of each link is an independent event, the probability that the number of nodes N that correctly decode the initial downlink packet from the macro node and can thereby participate in retransmission is greater than $n_s$ is given by Equation 8:

$$P[N \geq n_s] = \sum_{k=n_s}^{n} \binom{n}{k}\left[\prod_{j \in S_k}(1 - F(MCS_m, SINR_j^{(m)}))\right]\left[\prod_{j \notin S_k} F(MCS_m, SINR_j^{(m)})\right]. \quad \text{Equation 8}$$

In Equation 8, $S_k$ is the set of all small cell nodes that correctly decoded the packet from the macro eNB, and n is the total number of nodes in the UE's cluster that could potentially participate in the retransmission. Equation 8 can be approximated by Equation 9:

$$P[N \geq n_s] \approx \sum_{k=n_s}^{n} \binom{n}{k} q^k (1-q)^{n-k}. \quad \text{Equation 9}$$

In Equation 9, q is the probability that the node with the average channel condition to the macro eNB correctly decodes the packet, and is given by the following equation Equation 10:

$$q = 1 - F(MCS_m, SINR_j^{(m)})). \quad \text{Equation 10}$$

In Equation 10, the index j corresponds to the small cell node with the average SINR from the macro eNB. In some examples, the small cell node with the worst channel condition to the macro eNB may be selected for Equation 10 instead. Since this overestimates the probability of error, fewer retransmissions may be required.

Based on the preceding equations, the macro eNB (e.g., the macro eNB 105) can determine the MCS (e.g., $MCS_m$) to be used to transmit a downlink packet to a UE's cluster (e.g., the cluster 305) to target successful receipt by at least $n_s$ nodes to, thereby, yield at least $n_s$ nodes participating in distributed beamforming for the retransmissions to the UE (e.g., the UE 110). In some examples, the macro eNB (e.g., the macro eNB 105) can also determine the optimum MCS (e.g., $MCS_C$) for the cluster (e.g., the cluster 305) to use to retransmit the downlink packets to the UE (e.g., the UE 110). For example, the macro eNB can determine this MCS if each node in the cluster reports to the macro eNB the channel conditions (e.g., path loss, SINR, etc.) from the small cell node to the UE and the transmit power to be used by the small cell node.

In some examples, one or more conditions should be met by the UE in order for distributed beamforming to be used by the UE's small cell cluster for sending retransmissions to the UE. One example constraint that should be met in order to use distributed beamforming from the small cell cluster to the UE is that the UE's reported channel condition (e.g., the UE's channel state) between the small cell cluster and the UE should remain constant (or substantially constant) from the time the channel is measured to the time the downlink packet is transmitted to the UE. The channel state information for the UE can be obtained from the small cell nodes in the UE's cluster (e.g., by the small cell nodes measuring a UE's uplink signal, as described above, and/or by obtaining measurement reports from the UE, etc.) and reported to the macro eNB. Along with the channel state information, another example constraint that should be met in order to use distributed beamforming is that the UE's mobility state should also be known to the macro eNB. If the UE's uplink transmissions can also be decoded by the macro eNB, one way for the macro eNB to obtain the UE's mobility state for the macro eNB to measure whether the UE's channel is changing. Then, by evaluating these conditions, the macro eNB can determine whether distributed beamforming can be used.

Distributed beamforming, as disclosed herein, can be performed with a single antenna at each small cell node or with multiple antennas one or more of the small cell nodes. If there are multiple antennas at a small cell node, then the small cell node can individually form a beam to the UE, and this small cell node can then be treated as a single antenna node for distributed beamforming. In some examples, regardless of whether the small cell nodes have a single antenna or multiple antennas, to coordinate the transmission to the UE, the small cell nodes can measure the phase offset from the UEs uplink transmission. When the small cell nodes in the cluster transmit to the UE using distributed beamforming, each small cell node adjusts the phase by subtracting the measured phase offset, as described above.

In some examples, if the UE does not satisfy the constraints for distributed beamforming (e.g., if the channel conditions for the UE do not remain relatively constant over the time from which the channel conditions are measured to when the downlink packet is to be sent), or the small cell nodes are unable to obtain accurate downlink channel state information, (e.g., due to feedback limitation in frequency division duplex (FDD) systems), then SFN transmission techniques can be used by the small cell cluster instead of distributed beamforming for retransmissions to the UE.

The average SNR for retransmissions received at the UE (e.g., the UE 110) from the UE's small cell cluster (e.g., the cluster 305) when SFN transmission is used is given by Equation 11:

$$SINR_i^{(c)} = \frac{\sum_{j \in C}|h_{ji}|^2 P_{ji}}{I + \sigma_n^2}. \quad \text{Equation 11}$$

The parameters in Equation 11 are discussed above in connections with Equation 2. As the number of nodes that participate in the SFN transmission increases, the received SINR for the UE also increases. The received SINR from the cluster can be controlled by controlling the MCS used by the macro eNB to transmit to the cluster to ensure that enough nodes participate in the SFN transmission to the UE.

In order to ensure that the FER for the UE after the first retransmission from the cluster is below the target FER, the macro eNB can calculate the SINR difference (e.g., $\Delta SINR_i$ from Equation 6) after the first transmission from the macro eNB and the probability that at least $n_s$ small cell nodes receive the packet correctly from the macro eNB. The needed value for $n_s$ to compensate for the SINR difference is given by Equation 12:

$$n_s = \frac{\Delta SINR}{E_j\left(SINR_i^{(j)}\right)}. \qquad \text{Equation 12}$$

In Equation 12, $E_j$ ($SINR_i^{(j)}$) is an average of $SINR_i^{(j)}$ over all small cell j which participate in SFN retransmission. Alternatively, the SINR for the node with the worst channel condition can be used instead of the average SINR.

Example procedures performed by a macro eNB (e.g., the macro eNB 105) to configure a cluster of small cell nodes (e.g., the cluster 305) to retransmit downlink communications to a UE (e.g., the UE 110) are now described. For example, such procedures can be used by the macro eNB to determine whether distributed beamforming or SFN transmission is to be used by the UE's small cell cluster for retransmissions sent to the UE. Such procedures can also be used by the macro eNB to select the MCS to be used for communications from the macro eNB to the small cell cluster, and/or to select the MCS to be used for communications from the small cell cluster to the target UE. One such example procedure for the macro eNB is as follows. In this example procedure, it is assumed that the MCS used for communications from the macro eNB to the cluster is the same as the MCS used for communications from the cluster to the target UE. However, in general, the MCS used by the small cell cluster for the retransmissions can be different than MCS used for the initial transmission from the macro eNB to the cluster.

The example procedure begins with the macro eNB determining whether the UE satisfies the conditions for distributed beamforming mentioned above. If the UE satisfies the conditions for distributed beamforming, the macro eNB selects distributed beamforming for retransmissions from the cluster. Then, based on UE channel conditions (e.g., obtained from the small cell cluster or by the UE directly) and the number of small cell nodes (n) available to participate in retransmission, the macro eNB selects an MCS (e.g., the largest permissible MCS) and determines using Equation 7 the needed number of successful nodes, $n_s \leq n$, to cause the SINR from the cluster retransmissions to be able to make up for the SINR difference given by Equation 6. The macro eNB then determines whether the probability that at least $N=n_s$ of the available n small cell nodes will correctly decode the initial downlink packet from the macro node meets a target probability or, in other words, whether $p=P[N\geq n_s]\geq p^*$, where p is given by Equation 8 and Equation 9, and $p^*$ is a target success rate (e.g., such as $p^*=0.9$ or some other value). If $p>p^*$ then the macro eNB configures the selected MCS for the first transmission from the macro eNB to the cluster and for the retransmissions by the cluster to the UE using distributed beamforming. However, if $p<p^*$, then the macro eNB may select a lower MCS and/or rely on more retransmissions from the cluster to achieve the desired SINR from the cluster.

Otherwise, if the UE does not satisfy the constraints for distributed beamforming, then the macro eNB may select SFN transmission for retransmissions from the cluster. Then, based on UE channel conditions (e.g., obtained from the small cell cluster) and the number of small cell nodes (n) available to participate in retransmission, the macro eNB selects an MCS (e.g., the largest permissible MCS) and determines using Equation 12 the needed number of successful nodes, $n_s \leq n$, to cause the SINR from the cluster retransmissions to be able to make up for the SINR difference given by Equation 6. The macro eNB then determines whether the probability that at least $N=n_s$ of the available n small cell nodes will correctly decode the initial downlink packet from the macro node meets a target probability or, in other words, whether the probability that $p=P[N\geq n_s]\geq p^*$, where p is given by Equation 8 and Equation 9, and $p^*$ is a target success rate (e.g., such as $p^*=0.9$ or some other value). If $p>p^*$ then the macro eNB configures the selected MCS for the first transmission from the macro eNB to the cluster and for the retransmissions by the cluster to the UE using SFN transmission. However, if $p<p^*$, then the macro eNB may select a lower MCS and/or rely on more retransmissions from the cluster to achieve the desired SINR from the cluster.

Figure 12:
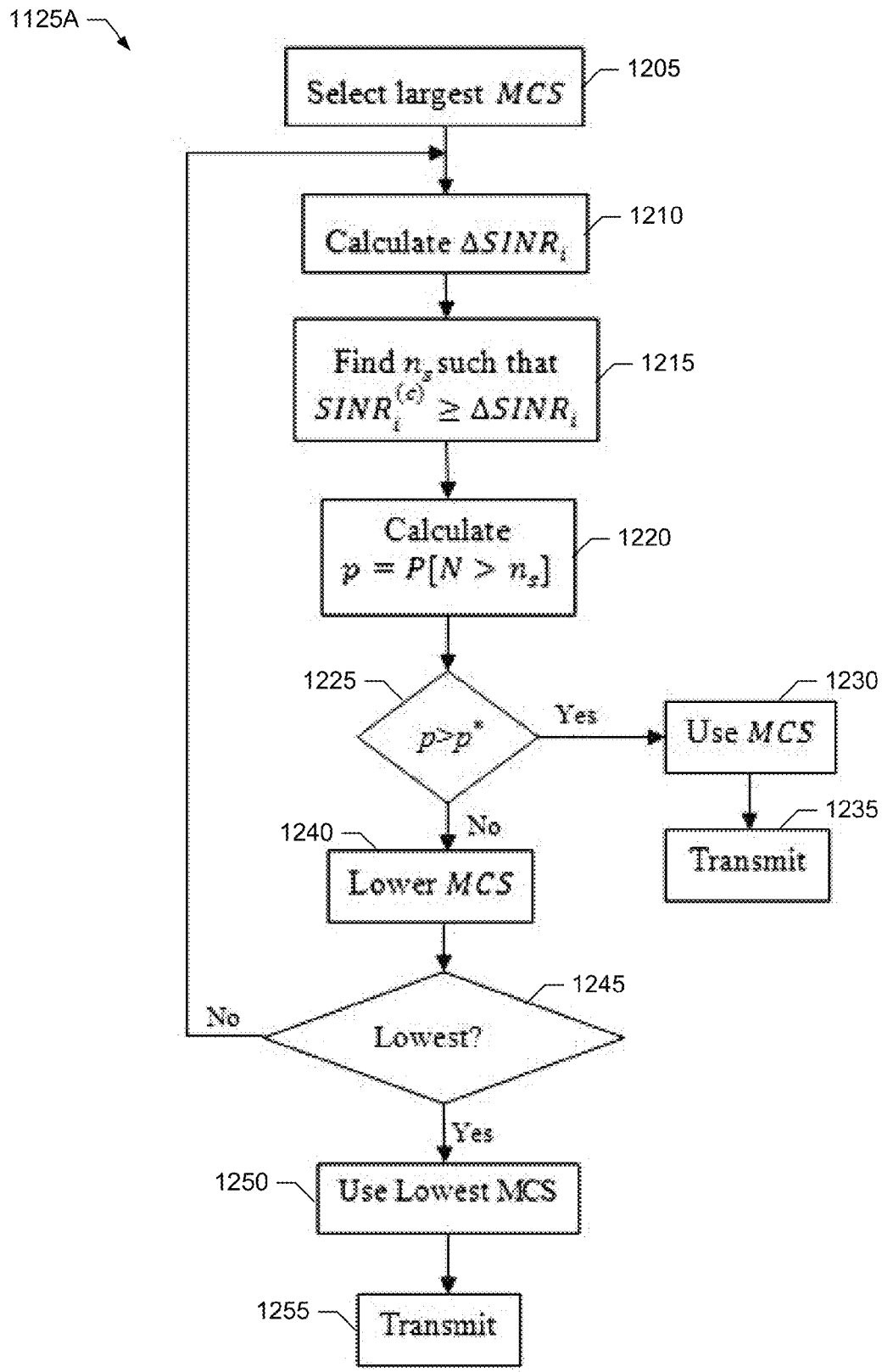
FIG. 12 is a flowchart representative of a first example modulation and coding scheme selection process that may be used to implement the process of FIG. 11.
Figure 13:
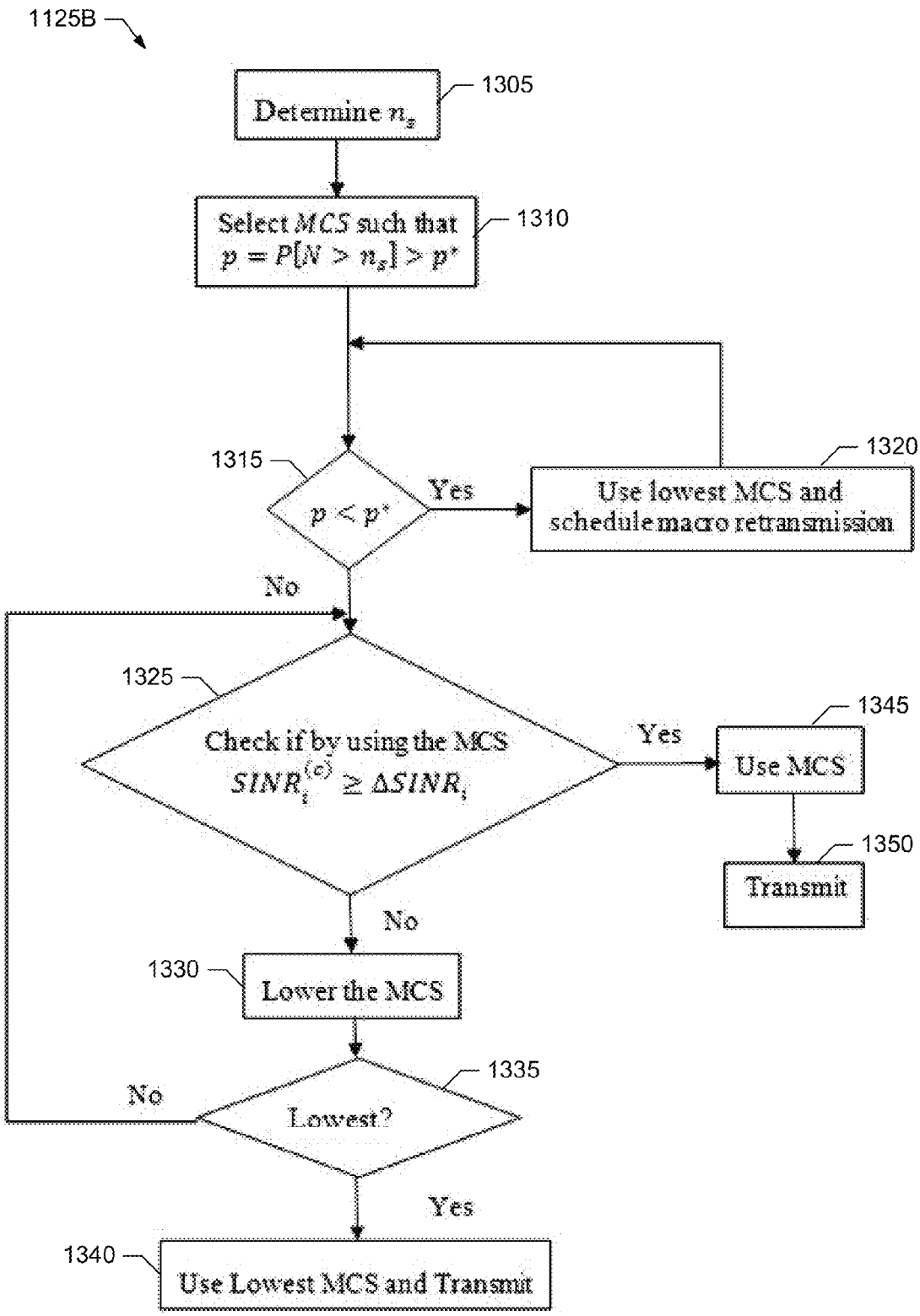
FIG. 13 is a flowchart representative of a second example modulation and coding scheme selection process that may be used to implement the process of FIG. 11.

Further example procedures that may be performed by a macro eNB (e.g., the macro eNB 105) to select the MCS(s) to be used by the macro eNB and the cluster are illustrated in FIGS. 12 and 13, which are described in further detail below.

In the example procedure described above for MCS selection by the macro eNB, it was assumed that the MCS for both the macro eNB transmissions to the cluster and the cluster retransmissions to the target UE were the same. If the MCS used by the cluster to retransmit to the UE is different from that used by the macro eNB for transmission to the cluster, then the combined SINR over all the transmission attempts can be estimated as follows. In some examples, this combined SINR should be greater than the target SINR corresponding to the last transmission attempt in order to achieve the target frame error rate (FER).

The combined SINR over different HARQ transmission attempts assuming the same MCS is used for all transmissions is given by Equation 13:

$$SINR_i = SINR_i^{(m)} + \sum_{k=1}^{K} SINR_{i,k}^{(C)}. \qquad \text{Equation 13}$$

In Equation 13, the parameter K corresponds to the number of retransmission attempts made to the UE (e.g., the UE 110), and the UE is assumed to perform soft-combining of the initial packet transmission and subsequent, different retransmissions.

If different MCSs are used for the initial transmission from the macro eNB to the cluster ($MCS_m$) and from the cluster to the UE ($MCS_C$), the combined SINR over different HARQ transmission attempts is given by Equation 14:

$$SINR_i = f(SINR_i^{(m)}, MCS_m, MCS_C) + \sum_{k=1}^{K} SINR_{i,k}^{(C)}. \qquad \text{Equation 14}$$

In Equation 14, the function $f$ ($SINR^{(1)}$, $MCS_1$, $MCS_2$) adjusts the $SINR^{(1)}$ for $MCS_1$ transmission to a corresponding $SINR^{(2)}$ for a different $MCS_2$ retransmission. If $MCS_1$ and $MCS_2$ have a same modulation order, then Equation 14 can be approximated by Equation 15:

$$SINR^{(2)} = f(SINR^{(1)}, MCS_1, MCS_2) = \frac{CR_2}{CR_1} SINR^{(1)}. \qquad \text{Equation 15}$$

In Equation 15, $CR_1$ and $CR_2$ are coding rates for $MCS_1$ and $MCS_2$, respectively. If $MCS_1$ and $MCS_2$ have different quadrature amplitude modulation (QAM) modulation orders, then Equation 14 can be approximated by Equation 16:

$$SINR^{(2)} = f(SINR^{(1)}, MCS_1, MCS_2) = \frac{CR_2 \log_2 M_2}{CR_1 \log_2 M_1} SINR^{(1)}. \qquad \text{Equation 16}$$

In Equation 16, $M_1$ and $M_2$ are modulation orders for $MCS_1$ and $MCS_2$ respectively, which could take values of, for example, 4, 16, or 64 in an LTE system, such as the mobile network 100 of FIG. 1.

To perform retransmission of downlink packets from a macro eNB (e.g., the macro eNB 105) to a UE (e.g., the UE 110), and/or to perform retransmission of uplink packets from the UE to the macro eNB as described in further detail below, the small cell nodes (e.g., the small cell nodes 120) of a cluster (e.g., the cluster 305) can use, for example, an amplify and forward (AF) approach or a decode and forward (DF) approach. In the AF approach, a receiving small cell node amplifies and retransmits the waveform of an incoming packet without decoding the incoming packet. In the DF approach, a receiving small cell node receives and decodes an incoming packet, and then re-encodes the received packet for retransmission. If AF is used, then the MCS used by the small cell nodes of the cluster to retransmit to the target recipient is the same as the MCS used by the original transmitter to send the packet to the cluster. If DF is used, then the MCS used by the small cell nodes of the cluster to retransmit to the target recipient can be different from, or the same as, the MCS used by the original transmitter to send the packet to the cluster. The retransmission technique used by the relay nodes can be taken into account by the macro eNB when the macro eNB is selecting the MCS(s) to be used for configuring retransmissions.

If there are multiple antennas at the small cell nodes of a cluster, then a small cell node having multiple antennas can determine its own precoding for the beamforming at the small cell level and this can be transparent to the macro eNB. The macro eNB can decide the transmit power at each small cell node. Alternatively, the small cell node can use a fixed transmit power or it can determine its own transmit power if there is a fixed relationship between the transmit power and the channel condition of the individual links. The maximum transmit power can be defined by the macro eNB.

Figure 6:
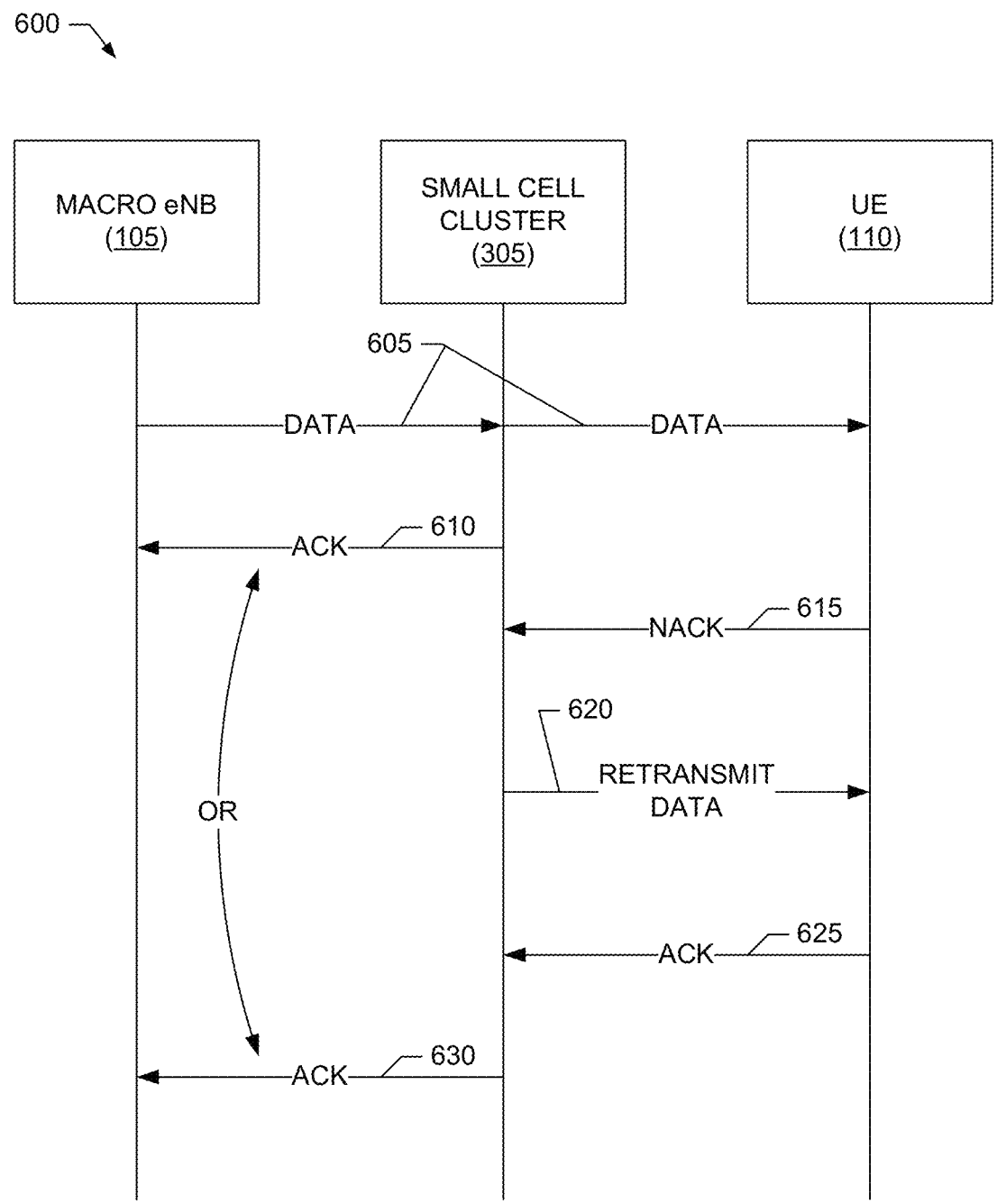
FIG. 6 is a first example message sequence diagram illustrating a first example downlink data acknowledgment procedure that supports retransmitting of downlink communications using small cell clusters, as disclosed herein.
Figure 7:
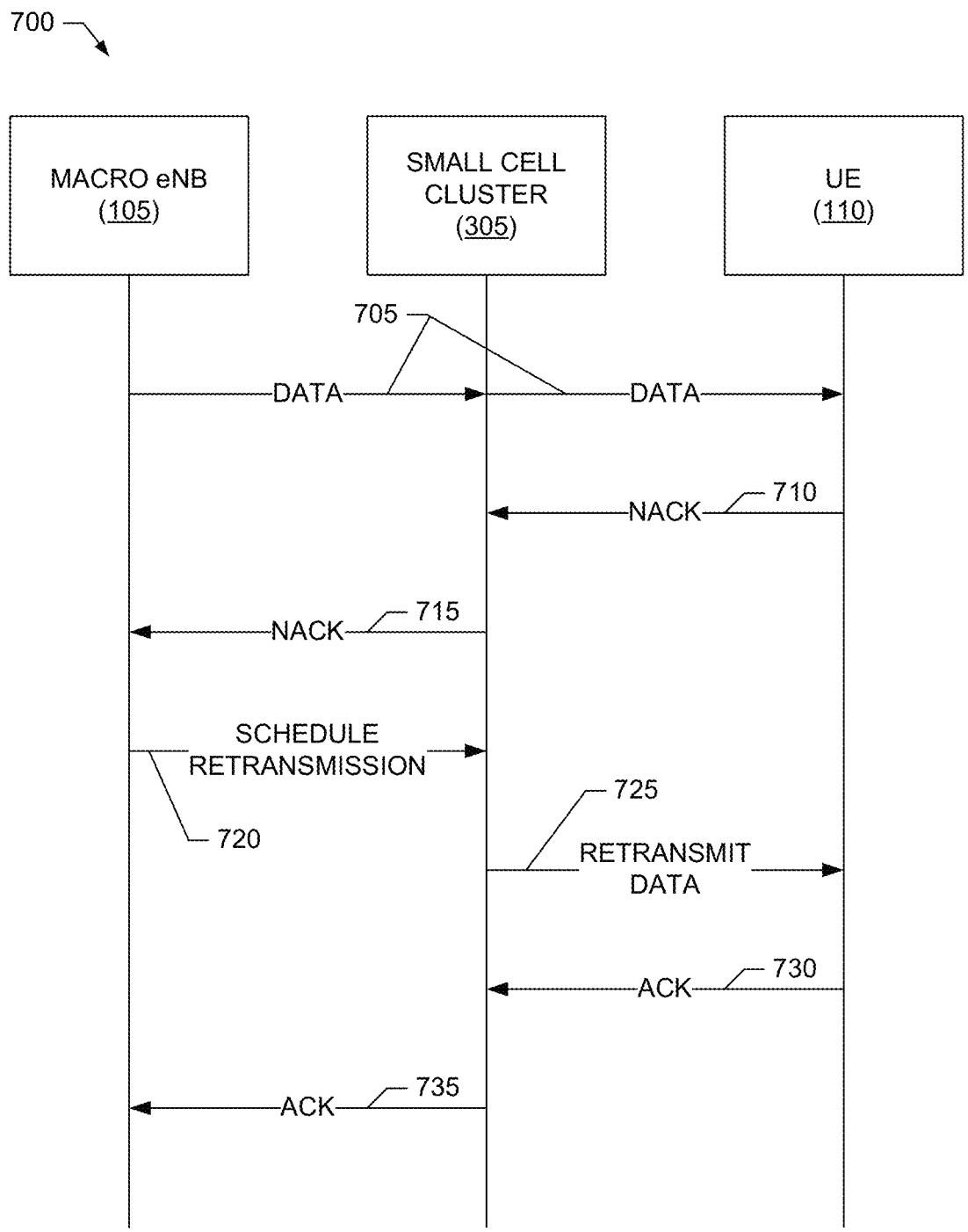
FIG. 7 is a second example message sequence diagram illustrating a second example downlink data acknowledgment procedure that supports retransmitting of downlink communications using small cell clusters, as disclosed herein.

Example message sequence diagrams 600 and 700 illustrating different example HARQ procedures that support retransmitting downlink packets using small cell clusters (e.g., such as the cluster 305) are illustrated in FIGS. 6 and 7. The message sequence diagrams 600 illustrates an example synchronous HARQ procedure, whereas the message sequence diagrams 700 illustrates an example asynchronous HARQ procedure. In the synchronous HARQ procedure represented by the message sequence diagrams 600 of FIG. 6, if the MCS and the resources used for the retransmissions are not changed, then the cluster 305 can retransmit without any assistance from the macro eNB 105. In some examples, the UE 110 can send an ACK/NACK to the cluster 305, instead of the macro eNB 105, if the UE is configured to do so by the macro eNB 105. In some examples, the small cell nodes 120 in the cluster 305 wait to forward an ACK to the macro eNB 105 until when an ACK is detected from the UE 110. In some examples, the cluster 305 waits to send a NACK to the macro eNB 105 until after all retransmission attempts fail. In some examples, the macro eNB 105 tries to detect the ACK on a pre-determined resource at pre-defined subframes. If an ACK is not detected, the macro eNB 105 assumes a NACK was sent by the UE 110, and further assumes that the cluster 305 will continue to retransmit until the maximum number of attempts is reached.

Because multiple small cell nodes 120 may forward the ACK to the macro eNB 105, the same resources can be used for the ACK. The combined ACK that is received by the macro eNB 105 can be sent by the cluster 305 using distributed beamforming or SFN transmission.

Turning to FIG. 6, the message sequence diagram 600 illustrates an example of the HARQ timing for a synchronous HARQ procedure performed by the example macro eNB 105, the example cluster 305 and the example target UE 110. The example message sequence diagram 600 of FIG. 6 begin with the macro eNB 105 sending a downlink packet 605 to the target UE 110 and the small cell cluster 305 configured for the target UE 110. In some examples, the macro eNB 105 sends the downlink packet 605 directly to the target UE 110, whereas in other examples the small cell cluster 305 additionally or alternatively sends (e.g., relays) the initial downlink packet 605 to the UE 110. Next, in some examples described in further detail below, the small cell cluster 305 responds to the downlink packet 605 by sending an ACK 610 to the macro eNB 105 to positively acknowledge the downlink packet 605 without waiting for an ACK from the UE 110. Sometime later, in the illustrated example of FIG. 6, the UE 110 sends a NACK 615 to the cluster 305 to indicate that the downlink packet 605 was not received correctly. In response to receiving the NACK 615, the cluster 305 retransmits the downlink packet (represented by the reference numeral 620) to the UE 110 using, for example, distributed beamforming or SFN transmission, as described above. In the illustrated example of FIG. 6, the UE 110 sends an ACK 625 to the cluster 305 to indicate that the retransmitted downlink packet 620 was received correctly. In some examples, if the cluster 305 has not already sent a prior ACK to the macro eNB 105 to positively acknowledge the initial downlink packet 605, then the cluster 305 sends an ACK 630 to macro eNB 105 in response to receiving the ACK 625 from the UE 110.

In some examples, if decode errors at one or more small cell nodes (e.g., one or more small cell nodes 120 of the cluster 305) cause an ACK from the UE (e.g., the UE 110) to be detected as a NACK, then the one or more small cell nodes may continue to retransmit to the UE, which may waste some resources. However, there is little to no impact to the UE in this case.

In some examples, the UE (e.g., the UE 110) can target the ACK/NACK to the macro eNB (e.g., the macro eNB 105). This may eliminate the additional delay in forwarding the final ACK/NACK from the cluster (e.g., the cluster 305) to the macro eNB. The UE may have to employ a higher transmit power in such an example.

In some examples, the small cell nodes (e.g., the small cell nodes 120 of the cluster 305) can directly ACK the initial transmission from the macro eNB (e.g., the macro eNB 105) before receiving the ACK from the target UE (e.g., the target UE 110). In such examples, the link between the macro eNB and the small cell nodes has a deterministic HARQ timing. In some examples, any failure of the small cell node to UE link can be handled by higher protocol layers.

In the asynchronous HARQ procedure represented by the message sequence diagrams 700 of FIG. 7, the macro eNB 105 schedules each retransmission using, for example, the LTE enhanced packet downlink control channel (EPDCCH) to coordinate the cluster's small cell nodes 120 participating in the retransmissions. In such a procedure, the small cell nodes 120 of the cluster 305 send an ACK/NACK to the macro eNB 105 after each transmission attempt. This scheme may be more flexible than the synchronous HARQ procedure of FIG. 6 because the MCS and the resources can be modified for each retransmission attempt. However, asynchronous HARQ procedure may result in increased packet delay.

Turning to FIG. 7, the message sequence diagram 700 illustrates an example of the HARQ timing diagram for an asynchronous HARQ procedure performed by the example macro eNB 105, the example cluster 305 and the example target UE 110. The example message sequence diagram 700 of FIG. 7 begin with the macro eNB 105 sending a downlink packet 705 to the target UE 110 and the small cell cluster 305 configured for the target UE 110. In some examples, the macro eNB 105 sends the downlink packet 705 directly to the target UE 110, whereas in other examples the small cell cluster 305 additionally or alternatively sends (e.g., relays) the initial downlink packet 705 to the UE 110. Next, in the illustrated example of FIG. 7, the UE 110 sends a NACK 710 to the cluster 305 to indicate that the downlink packet 705 was not received correctly. In response to receiving the NACK 710, the cluster 305 sends a NACK 715 to the macro eNB 105. In response to receiving the NACK 715, the macro eNB 105 configures (represented by reference numeral 720) the cluster 305 to retransmit the downlink packet 705 to the UE 110. The cluster 305 then retransmits the downlink packet (represented by the reference numeral 725) to the UE 110 using, for example, distributed beamforming or SFN transmission, as described above. In the illustrated example of FIG. 7, the UE 110 sends an ACK 730 to the cluster 305 to indicate that the retransmitted downlink packet 725 was received correctly. The cluster 305 then sends an ACK 735 to macro eNB 105 in response to receiving the ACK 730 from the UE 110.

The asynchronous HARQ procedure of FIG. 7 may exhibit a scheduling delay and an additional delay in forwarding the ACK/NACK to the macro eNB 105 compared with the synchronous HARQ procedure of FIG. 6. In some examples, the additional forwarding delay can be avoided if the UE 110 sends the ACK/NACK to the macro eNB 105 directly. However, this may lead to an increase in the transmit power used by the UE 110.

Based on the foregoing discussion, the use of small cell clusters to retransmit downlink communications in the LTE mobile network 100 as disclosed herein may involve at least the following modifications to existing LTE specifications:

(1) Specification of a new radio network architecture containing a small cell cluster and the associated downlink retransmission schemes disclosed herein;

(2) Specification of new signaling between the macro eNB and the small cell nodes disclosed herein to support the disclosed downlink transmission schemes using the relay cluster;

(3) Specification of a new scheduling assignment message to be sent by a macro eNB to indicate, for example, whether distributed beamforming or SFN transmission to be used by a cluster to perform downlink retransmissions, as disclosed herein;

(4) Specification of signaling to provide channel quality indication (CQI) feedback from a UE to the small cell nodes in the UE's cluster to enable, for example, distributed beamforming and/or MCS selection as disclosed above; and/or (5) Specification of the example HARQ ACK/NACK procedures of FIGS. 6 and/or 7 to support the example disclosed retransmission schemes using small cell clusters.

As mentioned above, a second example solution disclosed herein is directed to performing uplink retransmission using a small cell cluster. For example, a small cell cluster, such as the small cell cluster 305, can also be used to assist uplink transmissions from a UE (e.g., the UE 110) to a macro eNB (e.g., the macro eNB 105). In such examples, the UE can transmit to the macro eNB with reduced power on an assigned uplink carrier. The UE's uplink small cell cluster can decode the uplink transmission and, if it is determined that the uplink transmission was not decoded correctly by the macro eNB, the small cell nodes of the cluster that decoded the packet correctly can retransmit the packet for the UE. In some examples, the small cell nodes can use a different carrier or the same carrier to retransmit the uplink packet.

Figure 8A:
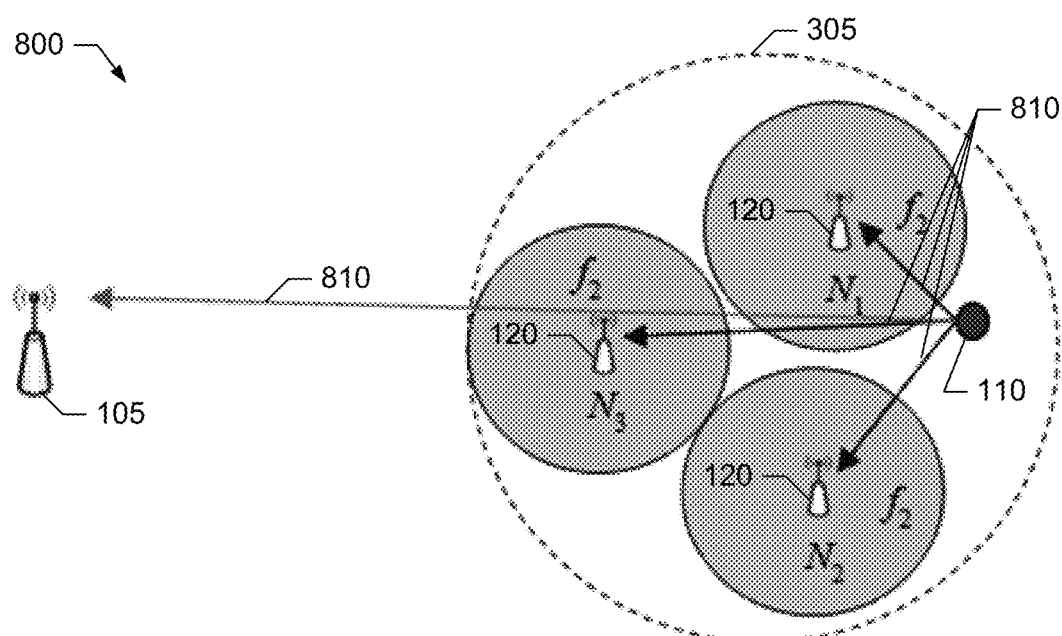
FIGS. 8A-B are block diagrams illustrating an example operation of the mobile network of FIG. 1 to retransmit uplink data using small cell clusters, as disclosed herein.
Figure 8B:
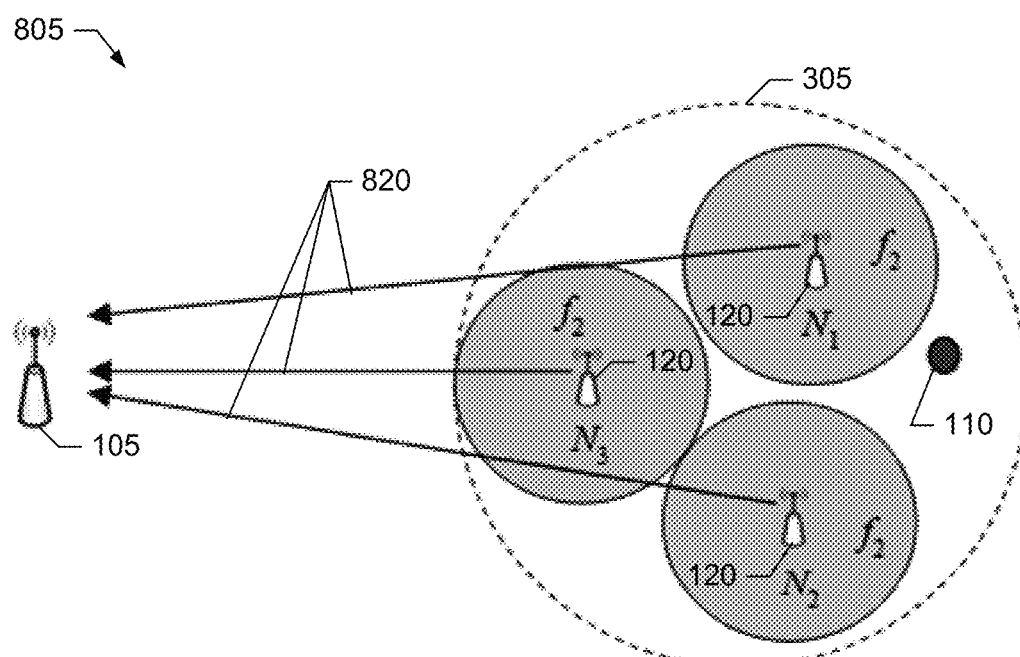

FIGS. 8A-B illustrate an example sequence of operations 800 and 805 in which an example small cell cluster, such as the small cell cluster 305, can be used to assist in UL retransmissions from a distant UE, such as the UE 110, to a serving macro eNB, such as the macro eNB 105. In some examples, retransmissions occur according to an acknowledgment procedure, such as a HARQ procedure. Turning to FIGS. 8A-B, during the first example operation 800, an initial transmission 810 of an uplink packet is sent by the UE 110 to the macro eNB. The initial transmission 810 of the uplink packet is also received by small cell nodes 120 in the small cell cluster 305 configured for the UE 110. During the subsequent second example operation 805, retransmissions (collectively represented by the reference numeral 820 in FIG. 8B) of the uplink packet are sent by the small cell cluster 305 to the macro eNB 105 if, for example, the small cell cluster 305 determines (e.g., by detecting a negative acknowledgment from the macro eNB 105) that the macro eNB 105 did not receive the initial uplink packet transmission 810.

In some examples, the UE 110 of FIGS. 8A-B can send uplink transmissions on a first carrier (e.g., $f_1$). The macro eNB 105 and the small cell nodes 120 in the UE's cluster 305 can try to decode an initial uplink packet sent by the UE 110. If a retransmission is needed, the small cell cluster 305 can retransmit the data to the macro eNB 105 on $f_1$, or any available frequency. For example, the retransmission from the cluster 305 can be on a TDD carrier using distributed beamforming. As another example, the retransmission from the cluster 305 can be sent using SFN transmission or a diversity combining scheme, such as combining based on Alamouti space time block coding (STBC) and/or space frequency block coding (SFBC), or large delay or small delay cyclic delay diversity (CDD) on either a TDD or an FDD carrier.

If the small cell nodes each retransmit the packet to the macro eNB individually, the FER for the retransmission of the UE's uplink packet is given by Equation 17:

$$FER_i = \prod_{j=1}^{N} [1 - (1 - G(MCS_i, SINR_{ij}))(1 - F(MCS_{jm}, SINR_{jm}))].$$

Equation 17

In Equation 17, $MCS_i$ is the MCS used by the UE (e.g., the UE 110) for the initial uplink transmission, $SINR_{ij}$ is the received SINR from the UE to the respective small cell node j of the UE's cluster, $MCS_{jm}$ is the MCS used by the small cell node j of the UE's cluster for retransmissions to the macro eNB (e.g., the macro eNB 105), and $SINR_{jm}$ is the received SINR from the small cell node j of the UE's cluster to the macro eNB. The functions F( ) and G( ) are functions of the frame error rate, as described above.

If the cluster retransmits the uplink packet using distributed beamforming, the UE (e.g., the UE 110) needs to transmit with sufficient power for the assigned MCS to reach at least $n_s$ small cell nodes of the cluster successfully in order to guarantee the FER for the transmission from the cluster. The probability that at least $n_s$ nodes decode the packet transmitted by the UE correctly is given by Equation 18:

$$P[N \geq n_s] = \sum_{k=n_s}^{n} \binom{n}{k} \left[ \prod_{j \in S_k} (1 - F(MCS_i, SINR_{ij})) \right] \left[ \prod_{j \notin S_k} F(MCS_i, SINR_{ij}) \right].$$

Equation 18

In Equation 18, $S_k$ is the set of all small cell nodes that receive the data correctly, and n represents the number of small cell nodes in the UE's cluster. Equation 18 can be approximated by the binomial probability distribution function given by Equation 9, which is discussed above in the context of downlink distributed beamforming. However, in the uplink case, the probability q of Equation 9 represents the probability that the small cell node j successfully decodes the uplink packet from UE i, which is given by Equation 19:

$$q = 1 - F(MCS_i, SINR_{ij}).$$

Equation 19

In some examples, when the macro eNB sends an uplink grant to the UE, the macro eNB can assign an MCS based on the UE's channel condition to the cluster rather than to the macro eNB. In such examples, the channel condition between the small cell nodes and the UE should be reported by the small cell nodes of the UE's cluster to the macro eNB. In some examples, a power control offset parameter can also be introduced in order to control the UE's uplink transmission power to the small cell cluster. The power control offset may allow the UE to use a higher MCS without transmitting at a higher power compared with the case where the UE targets the macro eNB directly with the same MCS. For example, the power control offset can be used whenever the macro eNB relies on the cluster to retransmit the packet for the UE. In some examples, a one bit indicator can be specified in the uplink grant that the macro eNB sends to the UE to indicate whether or not the power control offset is used, which can allow for dynamic use of the cluster for UL retransmissions. In some examples, another indicator can be included to specify how the retransmissions are to be acknowledged by the cluster, as described in further detail below.

In some examples, the power control offset can be calculated from the difference in (1) the path loss between the macro eNB and the UE and (2) the path loss measurements from the small cell cluster to the UEs. This difference can be calculated by the macro eNB if the UEs or the small cell nodes in the UEs UL cluster report, to the macro eNB, path loss measurements for the links between the small cell nodes of the cluster and the UE. In such examples, the equation for the power control offset can be given by, for example, Equation 20:

$$\Delta_{offset} = L_i^{(m)} - \max_j \{L_i^{(j)}\}.$$

Equation 20

In Equation 20, $\Delta_{offset}$ is the power control offset, $L_i^{(m)}$ is the path loss between the macro eNB and UE i, $L_i^{(j)}$ is the path loss between the small cell node j and UE i, and the maximum is taken over all the small cell nodes in the UE's UL cluster. In some examples, an averaging operation can be used to replace the maximum operation (i.e., max) in Equation 20.

Figure 9:
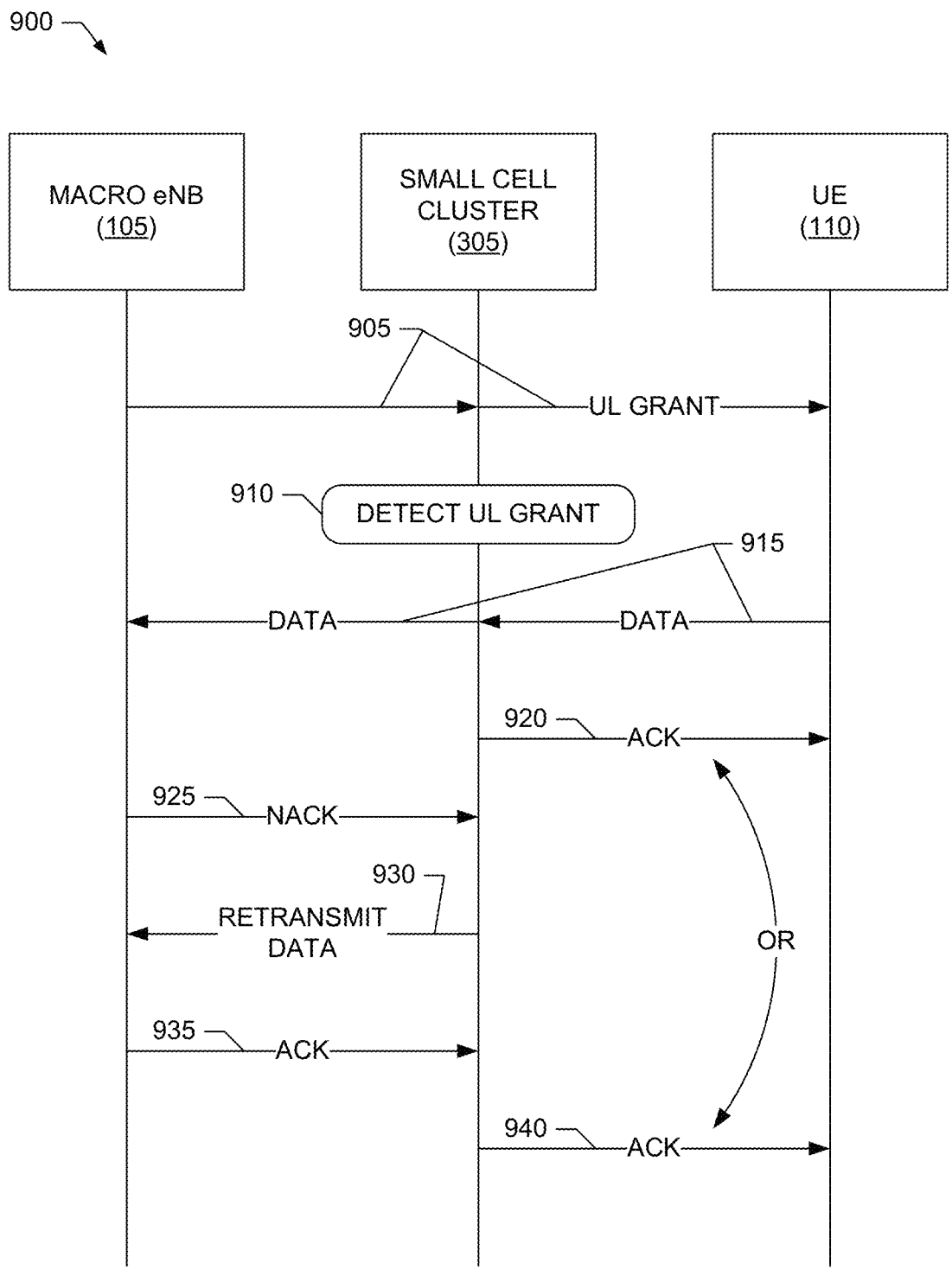
FIG. 9 is an example message sequence diagram illustrating an example uplink data acknowledgment procedure for use when retransmitting uplink communications using small cell clusters, as disclosed herein.

An example message sequence diagram 900 illustrating an example HARQ procedure that supports retransmitting uplink packets using small cell clusters (e.g., such as the cluster 305) is illustrated in FIG. 9. Turning to FIG. 9, the message sequence diagram 900 illustrates an example of the HARQ procedure performed by the example macro eNB 105, the example cluster 305 and the example target UE 110 for uplink retransmissions. The example message sequence diagram 900 of FIG. 9 begins with the macro eNB 105 sending an uplink grant to the UE 110. In the illustrated example, the small cell nodes of the small cell cluster 305 also detect the UL grant sent by the macro eNB 105 to the UE 110 (represented by the block 910 in FIG. 9). Sometime thereafter, the UE 110 sends an uplink packet 915 for receipt by the macro eNB 105. In the illustrated example, the small cell nodes of the small cell cluster 305 also receive the uplink packet 915. Next, in some examples, the small cell cluster 305 responds to the uplink packet 915 by sending an ACK 920 to the UE 110 to positively acknowledge the uplink packet 915 without waiting for an ACK from the macro eNB 105. Sometime later, in the illustrated example of FIG. 9, the macro eNB 105 sends a NACK 925 to the cluster 305 to indicate that the uplink packet 915 was not received correctly. In response to receiving the NACK 925, the cluster 305 retransmits the uplink packet (represented by the reference numeral 930) to the macro eNB 105 using, for example, distributed beamforming or SFN transmission, as described above. In the illustrated example of FIG. 9, the macro eNB 105 sends an ACK 935 to the cluster 305 to indicate that the retransmitted uplink packet 620 was received correctly. In some examples, if the cluster 305 has not already sent a prior ACK to the UE 110 to positively acknowledge the initial uplink packet 915, then the cluster 305 sends an ACK 940 to UE 110 in response to receiving the ACK 935 from the macro eNB 105.

In the example HARQ procedure of FIG. 9, the UE 110 transmits to the cluster 305 after receiving an UL grant from the macro eNB 105. The cluster 305 can retransmit the uplink packet to the macro eNB 105 until, for example, an ACK is received from the macro eNB 105 or a maximum number of retransmissions is reached. In some examples, the cluster 305 then sends an ACK or NACK to the UE 110. In other examples, the cluster 305 can send an ACK to the UE 110 immediately after receiving the initial transmission from the UE 110. The cluster 305 then continues to retransmit the uplink packet to the macro eNB 105 until the macro eNB 105 receives the data correctly.

Based on the foregoing discussion, the use of small cell clusters to retransmit uplink communications in the LTE mobile network 100 as disclosed herein may involve at least the following modifications to existing LTE specifications:

(1) Specification of new signaling to indicate to the UE whether or not to target a small cell cluster for uplink transmissions;

(2) Specification of a new parameter for the power control offset;

(3) Specification of HARQ ACK/NACK procedure(s) to support the uplink retransmission using the small cell cluster; and/or (4) Specification of new radio network architecture containing a small cell cluster and the associated uplink retransmission schemes disclosed herein.

As mentioned above, a third example solution disclosed herein is directed to defining the small cell cluster(s) for a UE. In some examples, one or more respective small cell clusters (e.g., such as the small cell cluster 305) can be defined for respective UEs (e.g., such as the UE 110). For example, for a given UE, a macro eNB (e.g., such as the macro eNB 105) could define a downlink small cell cluster that includes the nodes/carriers that can be decoded by the UE, and a separate uplink small cell cluster that includes the nodes/carriers that the UE can be assigned a target SNR that at least corresponds to a lowest MCS. In some examples, a third cluster may also be defined for a UE, which includes the small cell nodes that can participate in distributed beamforming to the UE when requested by the macro eNB.

In some examples, a macro eNB (e.g., the macro eNB 105) can define a downlink cluster $C_i^{(DL)}$ for a UE i using Equation 21:

$$C_i^{(DL)} = \{(j,k) | RSRP_{j,k} > RSRP_{thresh}, j \in N, k \in K\}. \quad \text{Equation 21}$$

In Equation 21, j indexes over the set of all small cell nodes, N, within a coverage area of the serving macro eNB, k indexes over the set of all the component carriers, K, the nodes are capable of using, $RSRP_{j,k}$ is the reference signal receive power (RSRP) measured for the $j^{th}$ small cell node and the $k^{th}$ component carrier, and $RSRP_{thresh}$ is a threshold.

In some examples, a macro eNB (e.g., the macro eNB 105) can define an uplink cluster $C_i^{(UL)}$ for a UE i using Equation 22:

$$C_i^{(UL)} = \{(j,k) | SINR_{ijk} > SINR_{target}^{(UL)}, j \in N, k \in K\}. \quad \text{Equation 22}$$

In Equation 22, $SINR_{ijk}$ is the received SINR at small cell node j from UE i on carrier k and $SINR_{target}^{(UL)}$ is the target SINR for uplink transmissions to the cluster.

In some examples, a macro eNB (e.g., the macro eNB 105) can define a distributed beamforming cluster, $C_i^{(DB)}$, for a UE i using Equation 23:

$$C_i^{(DB)} = \{j | (SINR_j^{(m)} > SINR_{target}^{(j)}) \wedge (SINR_i^{(j)} > SINR_{target}^{(DB)})\}. \quad \text{Equation 23}$$

In Equation 23, j indexes each small cell node in which (1) the SINR received from the macro eNB at the small cell node j ($SINR_j^{(m)}$) is greater than a target threshold ($SINR_t^{(j)}$) and (2) the SINR received from the small cell node j at the UE i ($SINR_i^{(j)}$) is greater than a target threshold ($SINR_{target}^{(DB)}$). In some examples, the distributed beamforming cluster, $C_i^{(j)}$, may be defined by the path loss from the small cell nodes to the UE rather than the SINR from the small cell node to the UE. In such examples, the macro eNB (e.g., the macro eNB 105) can define a distributed beamforming cluster, $C_i^{(DB)}$, for a UE i using Equation 24:

$$C_i^{(DB)} = \{j | (SINR_j^{(m)} > SINR_{target}^{(j)}) \wedge (L_i^{(j)} < L_{target}^{(DB)})\}. \quad \text{Equation 24}$$

In Equation 24, j indexes each small cell node in which (1) the SINR received from the macro eNB at the small cell node j ($SINR_j^{(m)}$) is greater than a target threshold ($SINR_{target}^{(j)}$) and (2) the path loss from the small cell node j to the UE i ($L_i^{(j)}$) is less than a target threshold ($L_{target}^{(DB)}$). Similar equations as Equation 23 and 24 can be used to define an SFN cluster using SFN SINR and target SINR values in place of the distributed beamforming SINR and target SINR values specified in those equations.

In Equation 23 and Equation 24, it is assumed that the channels for the different small cell nodes are mutually independent. This means the small cell nodes that are selected to form the distributed beamforming cluster should be sufficiently far apart. However, this is not a necessary condition for selecting the small cell nodes for distributed beamforming.

In some examples, corresponding small cell cluster sets are defined for each small cell node (e.g., small cell node 120) in a network (e.g., the mobile network 100). Such small cell cluster sets at the small cell node indicate which UE is to be served on the downlink when retransmissions are required and/or which UE is to be served on the uplink by retransmitting the UE traffic to the macro eNB.

Based on the foregoing discussion, defining small cell clusters as disclosed herein to support retransmission in the LTE mobile network 100 may involve at least the following modifications to existing LTE specifications:

(1) Specification of new signaling between the macro eNB and the small cell nodes to define the clusters; and (2) Specification of UE channel quality feedback for use in defining the clusters.

Figure 10:
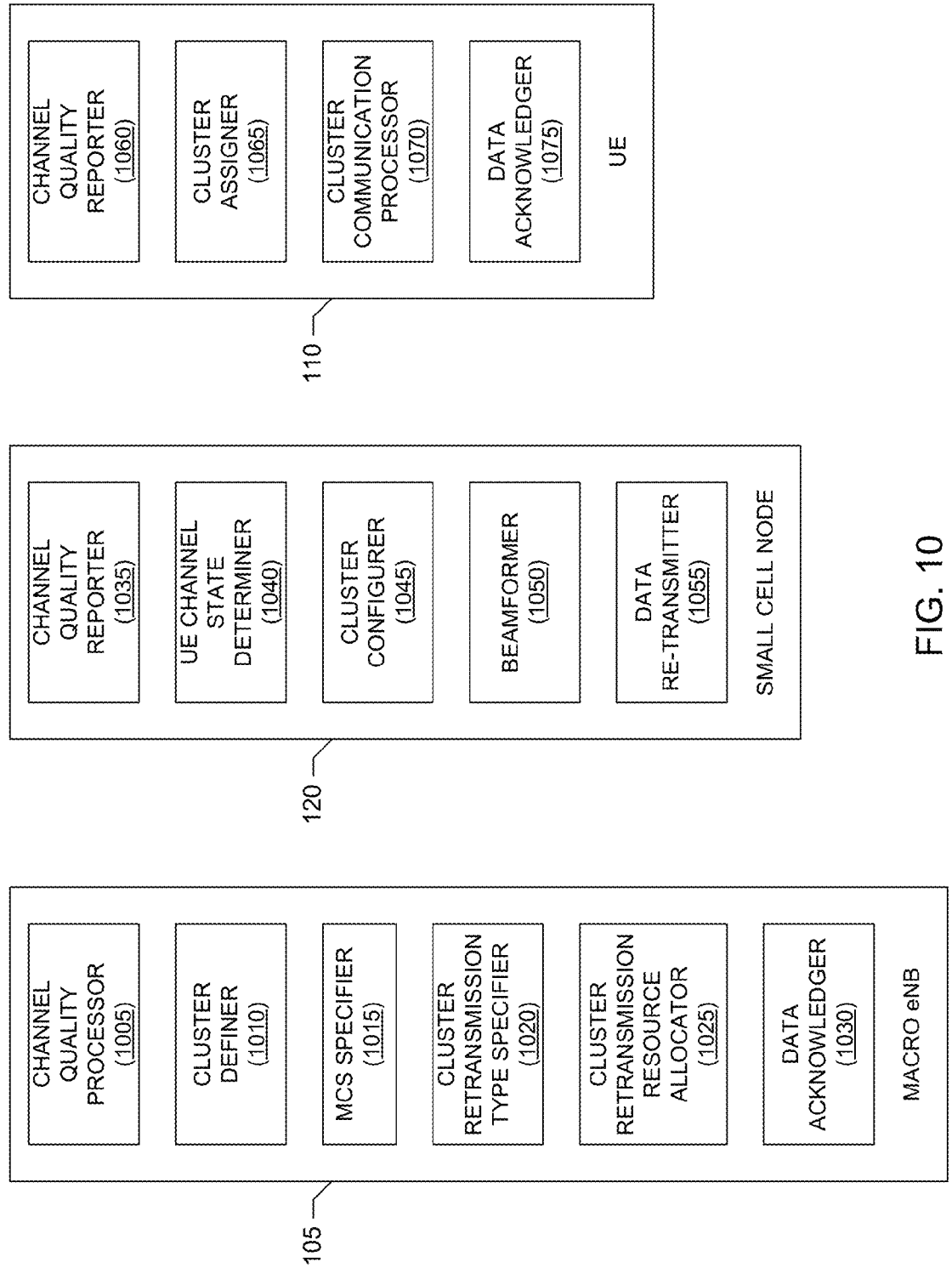
FIG. 10 illustrates block diagrams of an example macro eNB, an example small cell node and an example UE that may be used to implement the mobile network of FIG. 1.

Block diagrams illustrating example implementations of the macro eNB 105, a small cell node 120 and the UE 110 are provided in FIG. 10. In the illustrated example of FIG. 10, the block diagrams depict example elements of the macro eNB 105, the small cell node 120 and the UE 110 used to implement retransmission of communications using small cell clusters, as disclosed herein. Other functionality that may be implemented by the macro eNB 105, the small cell node 120 and the UE 110 is omitted from FIG. 10 for convenience and clarity.

Turning to FIG. 10, the illustrated example macro eNB 105 includes an example channel quality processor 1005 to determine channel quality data for use in implementing one or more of the first, second and/or third example solutions disclosed herein. For example, the channel quality processor 1005 can receive measurement reports and/or other signaling information from UEs (e.g., such as the UE 110) containing, for example, (1) channel quality information (CQI) measurements for the link between the macro eNB and the UE (from which $SINR_i^{(m)}$ values for the first example solution can be determined, etc.), (2) neighbor cell measurements for one or more small cell nodes (from which $SINR_i^{(C)}$ values for the first example solution can be determined, and/or from which $SINR_i^{(j)}$ and/or $L_i^{(j)}$ values for the third example solution can be determined, etc.), etc. Additionally or alternatively, in some examples, the channel quality processor 1005 can receive measurement reports and/or other signaling information from small cell nodes (e.g., such as the small cell node(s) 120) containing, for example, (1) CQI measurements for the links between UEs and the small cell node (from which $SINR_{ij}$ values and/or $L_i^{(j)}$ values for the second and/or third example solutions can be determined, and/or from which $SINR_{ijk}$ for the third example solution can be determined, etc.), (2) CQI measurements for the link between the macro eNB and the small cell nodes (e.g., from which $SINR_j^{(m)}$ values for the first example solution can be determined, etc.), (3) UE channel state information (e.g., from which the macro eNB 105 can determine whether a UE meets the conditions for distributed beamforming, in some examples, etc.), etc. Additionally or alternatively, in some examples, the channel quality processor 1005 can obtain/determine measurements of signals received from (1) UEs (e.g., from which $SINR_{jm}$ values and/or $L_i^{(m)}$ values for the second example solution can be determined, and/or from which the macro eNB 105 can determine whether a UE meets the conditions for distributed beamforming, in some examples, etc.), (2) small cell nodes (e.g., from which $RSRP_{j,k}$ values for the third example solution can be determined, etc.), etc.

The example macro eNB 105 of FIG. 10 also includes an example cluster definer 1010 to define small cell clusters for UEs (e.g., such as the UE 110) according to the third example solution disclosed herein. For example, for a given UE i, the cluster definer 1010 can define a downlink cluster $C_i^{(DL)}$, an uplink cluster $C_i^{(UL)}$ and/or a distributed beamforming cluster $C_i^{(DB)}$ using one or more of Equation 21 through Equation 24 discussed above. In some examples, one or more the downlink cluster $C_i^{(DL)}$, the uplink cluster $C_i^{(UL)}$ and/or the distributed beamforming cluster $C_i^{(DB)}$ a given UE i may be the same, whereas in other examples, the downlink cluster $C_i^{(DL)}$, the uplink cluster $C_i^{(UL)}$ and/or the distributed beamforming cluster $C_i^{(DB)}$ a given UE i may be different.

The example macro eNB 105 of FIG. 10 also includes an example MCS specifier 1015 to specify the MCS(s) to be used for downlink transmissions according to the first example solution disclosed herein. The MCS specifier 1015 can also determine the MCS(s) to be used for uplink transmissions according to the second example solution disclosed herein.

The example macro eNB 105 of FIG. 10 further includes an example cluster retransmission type specifier 1020 to determine and configure (e.g., via signaling) the type of retransmission procedure to be used by a UE's small cell cluster. For example, the cluster retransmission type specifier 1020 can specify, according to the first example solution disclosed herein, whether distributed beamforming or SFN transmission is to be used by a small cell cluster when performing retransmissions for a UE.

The example macro eNB 105 of FIG. 10 further includes an example cluster retransmission resource allocator 1025 to allocate resources (e.g., channels, frequency/time resources, etc.) to UEs and small cell nodes to support retransmission of communications using small clusters as disclosed herein.

The example macro eNB 105 of FIG. 10 also includes an example data acknowledger 1030 to implement, for example, one or more of the HARQ procedures included in the first example solution for supporting retransmitting of downlink packets using small cell clusters. The data acknowledger 1030 can also implement, for example, one or more of the HARQ procedures included in the second example solution for supporting retransmitting or uplink packets using small cell clusters.

The example small cell node 120 of FIG. 10 includes an example channel quality reporter 1035 to report channel quality data for use in implementing one or more of the first, second and/or third example solutions disclosed herein. For example, channel quality reporter 1035 can send measurement reports and/or other signaling information to a macro eNB (e.g., such as the macro eNB 105) containing, for example, (1) CQI measurements for the links between UEs and the small cell node (from which $SINR_{ij}$ values and/or $L_i^{(j)}$ values for the second and/or third example solutions can be determined, and/or from which $SINR_{ijk}$ for the third example solution can be determined, etc.), (2) CQI measurements for the link between the macro eNB and the small cell nodes (e.g., from which $SINR_j^{(m)}$ values for the first example solution can be determined, etc.), etc.

The example small cell node 120 of FIG. 10 also includes an example UE channel state determiner 1040 to determine UE channel state information (e.g., phase, path loss, etc.) from which the small cell node can implement distributed beamforming, in some examples, according to the first and/or second example solutions disclosed herein.

The example small cell node 120 of FIG. 10 further includes an example cluster configurer 1045 to obtain information (e.g., via signaling) from macro eNBs (e.g., the macro eNB 105) assigning the small cell node 120 to one or more small cell clusters for one or more UEs according to the third example solution disclosed herein.

The example small cell node 120 of FIG. 10 further includes an example beamformer 1050 to apply beamforming weights to downlink and/or uplink transmissions in accordance with the first and/or second example solutions disclosed herein.

The example small cell node 120 of FIG. 10 also includes an example data retransmitter 1055 to retransmit downlink packets and to implement, for example, one or more of the HARQ procedures included in the first example solution for supporting retransmitting of the downlink packets using small cell clusters. The data retransmitter 1055 can also retransmit uplink packets and implement, for example, one or more of the HARQ procedures included in the second example solution for supporting retransmitting or the uplink packets using small cell clusters.

The example UE 110 of FIG. 10 includes an example channel quality reporter 1060 to report channel quality data for use in implementing one or more of the first, second and/or third example solutions disclosed herein. For example, channel quality reporter 1060 can send measurement reports and/or other signaling information to a macro eNB containing, for example, (1) channel quality information (CQI) measurements for the link between the macro eNB and the UE (from which $SINR_i^{(m)}$ values for the first example solution can be determined, etc.), (2) neighbor cell measurements for one or more small cell nodes (from which $SINR_i^{(C)}$ values for the first example solution can be determined, and/or from which $SINR_i^{(j)}$ and/or $L_i^{(j)}$ values for the third example solution can be determined, etc.), etc. In some examples, the channel quality reporter 1060 also reports channel state information to one or more small cell nodes to support, for example, distributed beamforming in accordance with the first and/or second example solutions disclosed herein.

The example UE 110 of FIG. 10 also includes an example cluster assigner 1065 to obtain information (e.g., via signaling) from a macro eNB (e.g., the macro eNB 105) assigning the UE 110 to one or more small cell clusters according to the third example solution disclosed herein.

The example UE 110 of FIG. 10 also includes an example cluster communication processor 1070 to coordinate receipt of downlink retransmission(s) received from a small cell cluster in accordance with the first example solution disclosed herein. For example, the cluster communication processor 1070 can cause separate instances of retransmitted downlink packets to be soft-combined.

The example UE 110 of FIG. 10 further includes an example data acknowledger 1075 to implement, for example, one or more of the HARQ procedures included in the first example solution for supporting retransmitting of downlink packets using small cell clusters. The data acknowledger 1075 can also implement, for example, one or more of the HARQ procedures included in the second example solution for supporting retransmitting or uplink packets using small cell clusters.

While example manners of implementing the macro eNB 105, the UEs 105, 110 and/or 210 and the small cell node(s) 120 are illustrated in FIGS. 1-10, one or more of the elements, processes and/or devices illustrated in FIGS. 1-10 may be combined, divided, re-arranged, omitted, eliminated and/or implemented in any other way. Further, the example mobile network 100, the example macro eNB 105, the example UEs 105, 110 and/or 210, the example small cell node(s) 120, the example small cell cluster 305, the example communication links 505, the example channel quality processor 1005, the example cluster definer 1010, the example MCS specifier 1015, the example cluster retransmission type specifier 1020, the example cluster retransmission resource allocator 1025, the data acknowledger 1030, the example channel quality reporter 1035, the example UE channel state determined 1040, the example cluster configurer 1045, the example beamformer 1050, the example data retransmitter 1055, the example channel quality reporter 1060, the example cluster assigner 1065, the example cluster communication processor 1070 and/or the example data acknowledger 1075 of FIGS. 1-10 may be implemented by hardware, software, firmware and/or any combination of hardware, software and/or firmware. Thus, for example, any of the example mobile network 100, the example macro eNB 105, the example UEs 105, 110 and/or 210, the example small cell node(s) 120, the example small cell cluster 305, the example communication links 505, the example channel quality processor 1005, the example cluster definer 1010, the example MCS specifier 1015, the example cluster retransmission type specifier 1020, the example cluster retransmission resource allocator 1025, the data acknowledger 1030, the example channel quality reporter 1035, the example UE channel state determined 1040, the example cluster configurer 1045, the example beamformer 1050, the example data retransmitter 1055, the example channel quality reporter 1060, the example cluster assigner 1065, the example cluster communication processor 1070 and/or the example data acknowledger 1075 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example mobile network 100, the example macro eNB 105, the example UEs 105, 110 and/or 210, the example small cell node(s) 120, the example small cell cluster 305, the example communication links 505, the example channel quality processor 1005, the example cluster definer 1010, the example MCS specifier 1015, the example cluster retransmission type specifier 1020, the example cluster retransmission resource allocator 1025, the data acknowledger 1030, the example channel quality reporter 1035, the example UE channel state determined 1040, the example cluster configurer 1045, the example beamformer 1050, the example data retransmitter 1055, the example channel quality reporter 1060, the example cluster assigner 1065, the example cluster communication processor 1070 and/or the example data acknowledger 1075 is/are hereby expressly defined to include a tangible computer readable storage device or storage disk such as a memory, a digital versatile disk (DVD), a compact disk (CD), a Blu-ray disk, etc. storing the software and/or firmware. Further still, the example mobile network 100, the example macro eNB 105, the example UEs 105, 110 and/or 210, the example small cell node(s) 120, the example small cell cluster 305, the example communication links 505, the example channel quality processor 1005, the example cluster definer 1010, the example MCS specifier 1015, the example cluster retransmission type specifier 1020, the example cluster retransmission resource allocator 1025, the data acknowledger 1030, the example channel quality reporter 1035, the example UE channel state determined 1040, the example cluster configurer 1045, the example beamformer 1050, the example data retransmitter 1055, the example channel quality reporter 1060, the example cluster assigner 1065, the example cluster communication processor 1070 and/or the example data acknowledger 1075 may include one or more elements, processes and/or devices in addition to, or instead of, those illustrated in FIGS. 1-10, and/or may include more than one of any or all of the illustrated elements, processes and devices.

Flowcharts representative of example processes for implementing the example mobile network 100, the example macro eNB 105, the example UEs 110, 115 and/or 210, the example small cell node(s) 120, the example small cell cluster 305, the example communication links 505, the example channel quality processor 1005, the example cluster definer 1010, the example MCS specifier 1015, the example cluster retransmission type specifier 1020, the example cluster retransmission resource allocator 1025, the data acknowledger 1030, the example channel quality reporter 1035, the example UE channel state determined 1040, the example cluster configurer 1045, the example beamformer 1050, the example data retransmitter 1055, the example channel quality reporter 1060, the example cluster assigner 1065, the example cluster communication processor 1070 and/or the example data acknowledger 1075 are shown in FIGS. 11-15. In these examples, the processes may be implemented by one or more programs comprising machine readable instructions for execution by a processor, such as the processor 1612 shown in the example processor platform 1600 discussed below in connection with FIG. 16. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processor 1612, but the entire program or programs and/or portions thereof could alternatively be executed by a device other than the processor 1612 and/or embodied in firmware or dedicated hardware (e.g., implemented by an ASIC, a PLD, an FPLD, discrete logic, etc.). Also, one or more of the processes represented by the flowcharts of FIGS. 11-15, or one or more portion(s) thereof, may be implemented manually. Further, although the example processes are described with reference to the flowcharts illustrated in FIGS. 11-15, many other methods of implementing the example mobile network 100, the example macro eNB 105, the example UEs 110, 115 and/or 210, the example small cell node(s) 120, the example small cell cluster 305, the example communication links 505, the example channel quality processor 1005, the example cluster definer 1010, the example MCS specifier 1015, the example cluster retransmission type specifier 1020, the example cluster retransmission resource allocator 1025, the data acknowledger 1030, the example channel quality reporter 1035, the example UE channel state determined 1040, the example cluster configurer 1045, the example beamformer 1050, the example data retransmitter 1055, the example channel quality reporter 1060, the example cluster assigner 1065, the example cluster communication processor 1070 and/or the example data acknowledger 1075 may alternatively be used. For example, with reference to the flowcharts illustrated in FIGS. 11-15, the order of execution of the blocks may be changed, and/or some of the blocks described may be changed, eliminated, combined and/or subdivided into multiple blocks.

As mentioned above, the example processes of FIGS. 11-15 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 11-15 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

Figure 11:
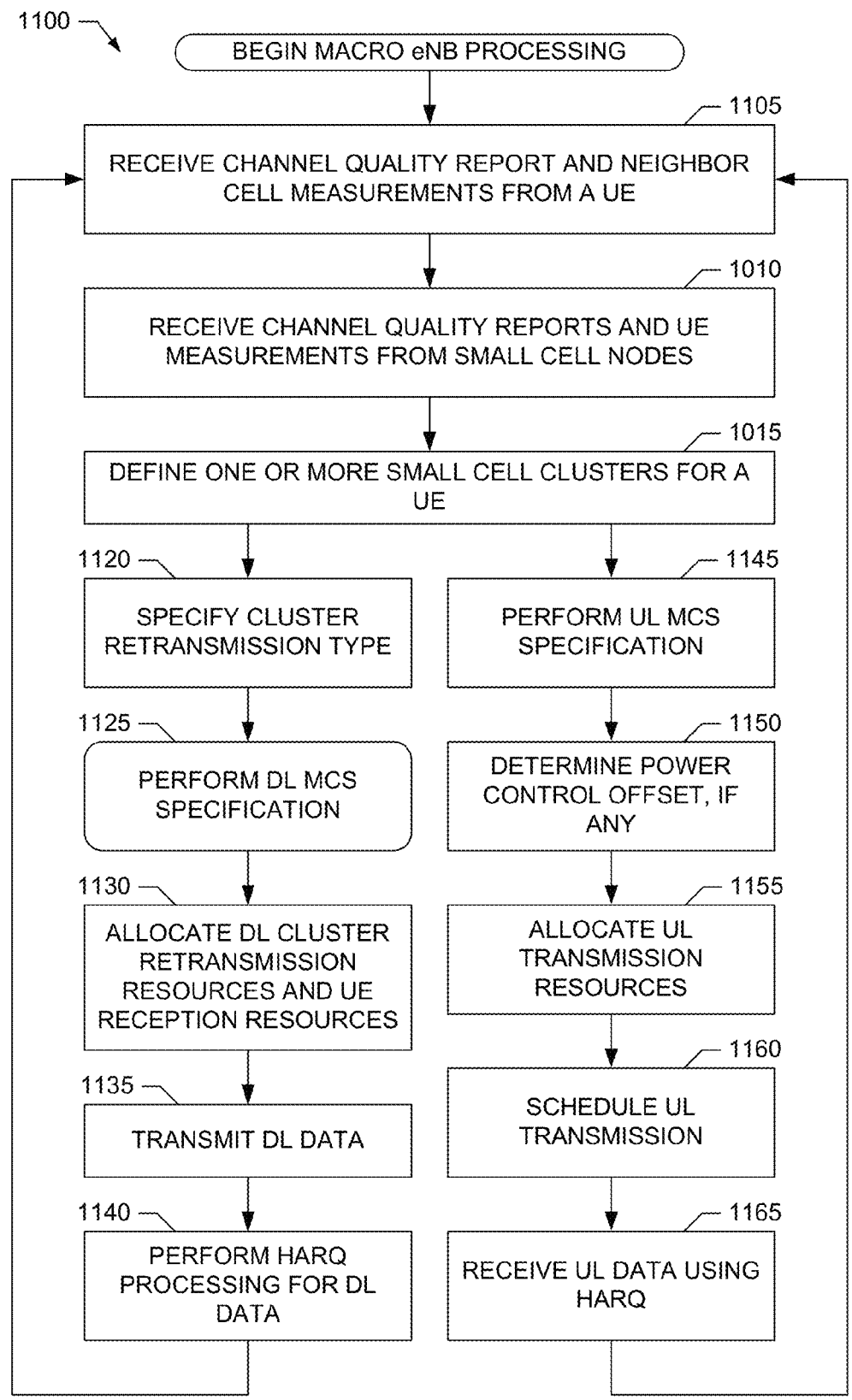
FIG. 11 is a flowchart representative of an example process that may be performed to implement the example macro eNB of FIG. 10.

An example process 1100 that may be executed to implement the example macro eNB 105 of FIGS. 1-10 is illustrated in FIG. 11. With reference to the preceding figures and associated written descriptions, the example process 1100 of FIG. 11 begins execution at block 1105 at which the channel quality processor 1005 of the macro eNB 105 receives channel quality reports and neighbor cell measurements from a UE (e.g., such as the UE 110), as described above. At block 1110, the channel quality processor 1005 of the macro eNB 105 receives channel quality reports and UE relayed measurements from small cell nodes 120 in the coverage area of the macro eNB 105, as described above. At block 1115, the cluster definer 1010 of the macro eNB 105 defines one or more small cell clusters (e.g., such as one or more clusters 305) for a UE (e.g., such as the UE 110). For example, at block 1115, the cluster definer 1010 can define a downlink cluster $C_i^{(DL)}$, an uplink cluster $C_i^{(UL)}$ and/or a distributed beamforming cluster $C_i^{(DB)}$ for a UE i, as described above After a downlink cluster $C_i^{(DL)}$ is defined for a UE i, at block 1120 the cluster retransmission type specifier 1020 of the macro eNB 105 specifies whether the cluster is to perform retransmissions using, for example, distributed beamforming or SFN transmission, as described above. At block 1125, the example MCS specifier 1015 of the macro eNB 105 specifies the MCS to be used for downlink transmission from the macro eNB 105 to the UE's downlink cluster (e.g., the cluster 305), and the MCS to be used for downlink retransmissions from the UE's downlink cluster to the UE (e.g., the UE 110), as described above. Example MCS selection procedures for implementing the processing at block 1125 are illustrated in FIGS. 12 and 13, which are discussed in further detail below.

At block 1130, the cluster retransmission resource allocator 1025 of the macro eNB 105 allocates downlink cluster and UE reception resources (e.g., channels, frequency/time resources, etc.), as described above. At block 1135, the macro eNB 105 transmits a downlink packet to the UE. At block 1140, the data acknowledger 1030 performs one or more of the HARQ procedures described above to confirm that the UE has received the transmitted downlink packet.

Returning to block 1115, after an uplink cluster $C_i^{(UL)}$ is defined for a UE at block 1145 the example MCS specifier 1015 of the macro eNB 105 specifies the MCS to be used for uplink transmission from the UE (e.g., the UE 110) to the macro eNB and the UE's uplink cluster (e.g., the cluster 305), and the MCS to be used for uplink retransmissions from the UE's uplink cluster to the macro eNB 105, as described above. At block 1150, the cluster retransmission resource allocator 1025 of the macro eNB 105 determines a power control offset, as described above, to be signaled to the UE for use when the UE sends an initial uplink packet for receipt by the uplink cluster. At block 1155, the cluster retransmission resource allocator 1025 allocates uplink cluster and UE transmission resources (e.g., channels, frequency/time resources, etc.), as described above. At block 1160, the macro eNB 105 schedules an uplink transmission for the UE (e.g., by sending an uplink grant), as described above. At block 1165, the data acknowledger 1030 performs one or more of the HARQ procedures described above to confirm receipt of an uplink packet received from the UE (and/or the UEs uplink cluster).

A first example MCS selection procedure 1125A that may be used to implement the processing at block 1125 of FIG. 11 is illustrated in FIG. 12. With reference to the preceding figures and associated written descriptions, the example process 1125A of FIG. 12 begins with the MCS specifier 1015 of the macro eNB 105 selecting a largest MCS (block 1205) and calculating the difference SINR for the UE assuming the target SINR corresponding to the selected MCS (block 1210), as described above. The MCS specifier 1015 of the macro eNB 105 then determines the number of small cell nodes that are needed to participate in order to achieve an SINR that is at least equal to the difference SINR for the UE (block 1215), as described above. This number represents the number of small cell nodes that need to receive the downlink packet successfully from the macro eNB to achieve the difference SINR. After calculating the probability that at least the needed number of small nodes will receive the downlink packet successfully (block 1220), the MCS specifier 1015 of the macro eNB 105 compares the calculated probability with the target probability, p* (block 1225). If the target probability is satisfied (block 1225), the MCS specifier 1015 of the macro eNB 105 can set $MCS_m$ and $MCS_c$ to the selected MCS (block 1230). The macro eNB 105 can then transmit a downlink packet using the selected MCS (block 1235). Otherwise, the MCS specifier 1015 of the macro eNB 105 reduces the selected MCS (block 1240) and repeats the procedure until the target probability is satisfied or the lowest MCS has been selected (block 1245). If the target probability cannot be satisfied with the lowest MCS, then the MCS specifier 1015 of the macro eNB 105 can set $MCS_m$ and $MCS_c$ to the lowest MCS (block 1250). The macro eNB 105 can then transmit a downlink packet using the selected MCS (block 1255), and can rely on more retransmissions from the downlink small cell cluster to achieve the target FER.

A second example MCS selection procedure 1125B that may be used to implement the processing at block 1125 of FIG. 11 is illustrated in FIG. 13. With reference to the preceding figures and associated written descriptions, the example process 1125B of FIG. 13 begins with the MCS specifier 1015 of the macro eNB 105 determining the number of nodes in the UE's downlink small cell cluster that can potentially participate in the retransmission (block 1305) and selecting an MCS to ensure that the probability that those nodes receive the packet correctly is greater than the target probability of success, p* (block 1310). If the target probability is not satisfied (block 1315) then the MCS specifier 1015 of the macro eNB 105 selects the lowest MCS (block 1320) and more retransmissions may be needed to achieve a target FER. However, if the target probability is not satisfied (block 1315), then the MCS specifier 1015 of the macro eNB 105 can determine if the selected MCS satisfies the UE's SINR constraint (block 1325). If the SINR constraint is not satisfied (block 1325), then the MCS specifier 1015 of the macro eNB 105 can lower the MCS from the macro eNB to the cluster (block 1330) until the lowest MCS is selected (block 1335), at which the macro eNB 105 can then transmit a downlink packet using the lowest MCS (block 1340), and can rely on more retransmissions from the downlink small cell cluster to achieve the target FER. However, if the SINR constraint is satisfied (block 1345), then the MCS specifier 1015 of the macro eNB 105 can set $MCS_m$ and $MCS_c$ to the selected MCS (block 1345), and the macro eNB 105 can then transmit a downlink packet using the selected MCS (block 1350).

The second example MCS selection procedure 1125B can account for the case where some of the small cell nodes that successfully receive the packet from the macro eNB 105 cannot serve the UE 110, for example, due to loading of the small cell nodes.

Figure 14:
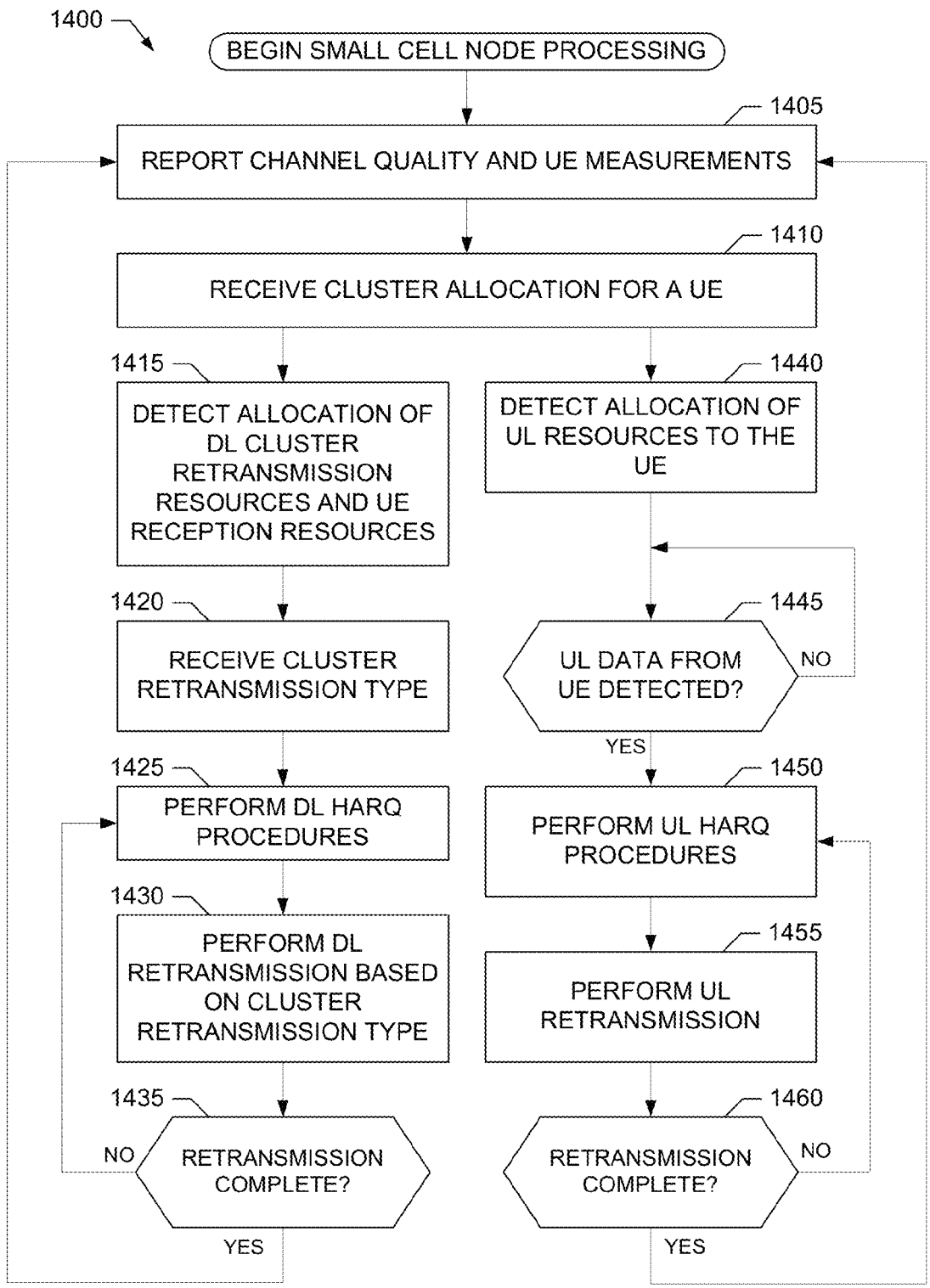
FIG. 14 is a flowchart representative of an example process that may be performed to implement the example small cell node of FIG. 10.

An example process 1400 that may be executed to implement an example small cell node 120 of FIGS. 1-10 is illustrated in FIG. 14. With reference to the preceding figures and associated written descriptions, the example process 1400 of FIG. 14 begins execution at block 1405 at which the channel quality reporter 1035 of the small cell node 120 reports channel quality measurements, and may relay UE measurements, to a macro eNB (e.g., such as the macro eNB 105). At block 1410, the cluster configurer 1045 of the small cell node 120 receives a cluster allocation for a UE (e.g., such as the UE 110), as described above. For example, the small cell node 120 may be allocated to a downlink cluster $C_i^{(DL)}$, an uplink cluster $C_i^{(UL)}$ and/or a distributed beamforming cluster $C_i^{(DB)}$ for a UE i.

After the small cell node 120 is allocated to a downlink cluster $C_i^{(DL)}$ for a UE i, at block 1415 the small cell node 120 receives (e.g., via signaling) the downlink cluster retransmission resources and the UE reception resources allocated by the macro eNB for a particular UE i. At block 1420, the small cell node 120 receives the cluster retransmission type (e.g., distributed beamforming or SFN transmission) from the macro eNB, as described above. At block 1425, the example data retransmitter 1055 of the small cell node 120 performs one or more of the HARQ procedures described above to confirm receipt of a downlink packet sent from the macro eNB to a UE for which the small cell node is included in the UE's downlink cluster. At block 1430, data retransmitter 1055 retransmits the downlink packet, as appropriate, according to the HARQ procedure performed at block 1425 and the cluster transmission type received at block 1420. Also, if the cluster transmission type specifies distributed beamforming, then at block 1425 the data retransmitter 1055 may invoke the beamformer 1050 of the small cell node 120 to retransmit the downlink packet using distributed beamforming, as described above. Processing at blocks 1425 and 1430 then repeats until retransmission of the downlink packet is complete (see block 1435), such as until an ACK is received from the UE or the maximum number of retransmissions are performed.

Returning to block 1410, after the small cell node 120 is allocated to an uplink cluster $C_i^{(UL)}$ for a UE i, at block 1440 the small cell node 120 detects an allocation of uplink resources for the UE. For example, the small cell node 120 may detect an uplink grant sent by a macro eNB (e.g., the macro eNB 105) to the UE (e.g., the UE 110). Next, the small cell node 120 waits to receive an uplink packet sent from the UE using the allocated uplink resources (see block 1445). At block 1450, the example data retransmitter 1055 of the small cell node 120 performs one or more of the HARQ procedures described above to confirm receipt of an uplink packet sent from the UE (for which the small cell node is included in the UE's uplink cluster) to the macro eNB. At block 1455, data retransmitter 1055 retransmits the uplink packet, as appropriate, according to the HARQ procedure performed at block 1450. Also, at block 1455 the data retransmitter 1055 may invoke the beamformer 1050 of the small cell node 120 to retransmit the uplink packet using distributed beamforming, as described above. Processing at blocks 1450 and 1455 then repeats until retransmission of the uplink packet is complete (see block 1460), such as until an ACK is received from the macro eNB or the maximum number of retransmissions are performed.

Figure 15:
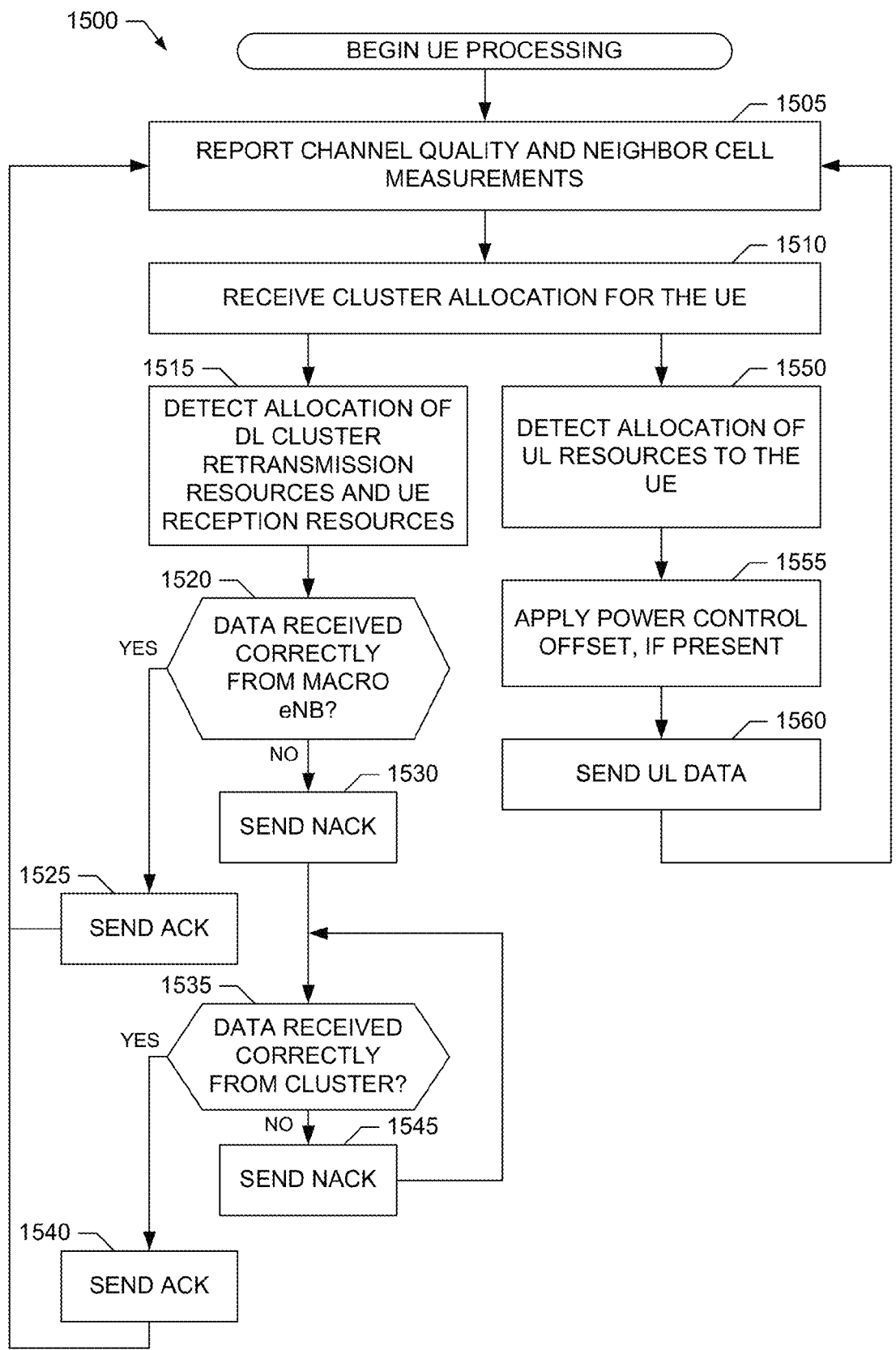
FIG. 15 is a flowchart representative of an example process that may be performed to implement the example UE of FIG. 10.

An example process 1500 that may be executed to implement the example UE 110 of FIGS. 1-10 is illustrated in FIG. 15. With reference to the preceding figures and associated written descriptions, the example process 1500 of FIG. 15 begins execution at block 1505 at which the channel quality reporter 1060 of the UE 110 reports channel quality measurements and neighbor cell measurements to a serving macro eNB (e.g., such as the macro eNB 105), and possibly to one or more small cell nodes (e.g., the nodes 120) included in existing small cell cluster(s) defined for the UE 110, as described above. At block 1510, the cluster assigner 1065 of the UE 110 receives information from the macro eNB identifying the small cell nodes allocated to one or more small cell clusters, such as a downlink cluster $C_i^{(DL)}$, an uplink cluster $C_i^{(UL)}$ and/or a distributed beamforming cluster $C_i^{(DB)}$, for the UE 110, as described above.

After a downlink cluster $C_i^{(DL)}$ is allocated to the UE 110, at block 1515 the cluster communication processor 1070 of the UE 110 detects (e.g., via signaling) the downlink cluster retransmission resources and the UE reception resources allocated by the macro eNB. At block 1520, the data acknowledger 1075 of the UE 110 detects whether a downlink packet has been received correctly from the macro eNB. If the data packet is received correctly (block 1520), then at block 1525 the data acknowledger 1075 responds by sending an ACK for receipt by the macro eNB and/or the UE's downlink small cell cluster. However, if the data packet is not received correctly (block 1520), then at block 1530 the data acknowledger 1075 responds by sending an NACK for receipt by the macro eNB and/or the UE's downlink small cell cluster. After sending the NACK, at block 1535 the data acknowledger 1075 detects whether a retransmission of downlink packet has been received correctly from the UE's downlink small cell cluster. If the retransmitted data packet is received correctly (block 1535), then at block 1540 the data acknowledger 1075 responds by sending an ACK for receipt by the UE's downlink small cell cluster. However, if the retransmitted data packet is not received correctly (block 1535), then at block 1545 the data acknowledger 1075 responds by sending a NACK for receipt by the UE's downlink small cell cluster.

Returning to block 1510, after an uplink cluster $C_i^{(UL)}$ allocated to the UE 110, at block 1550 the cluster communication processor 1070 of the UE 110 detects (e.g., via an uplink grant) an allocation of uplink transmission resources made by the macro eNB for the UE 110, as described above. At block 1555, the cluster communication processor 1070 applies a power control offset (e.g., if one has been received from the macro eNB) to the uplink transmissions to be sent by the UE 110, as described above. Then, at block 1560, the UE 110 sends an uplink packet for receipt by the macro eNB (and/or by the UE's uplink small cell cluster).

Figure 16:
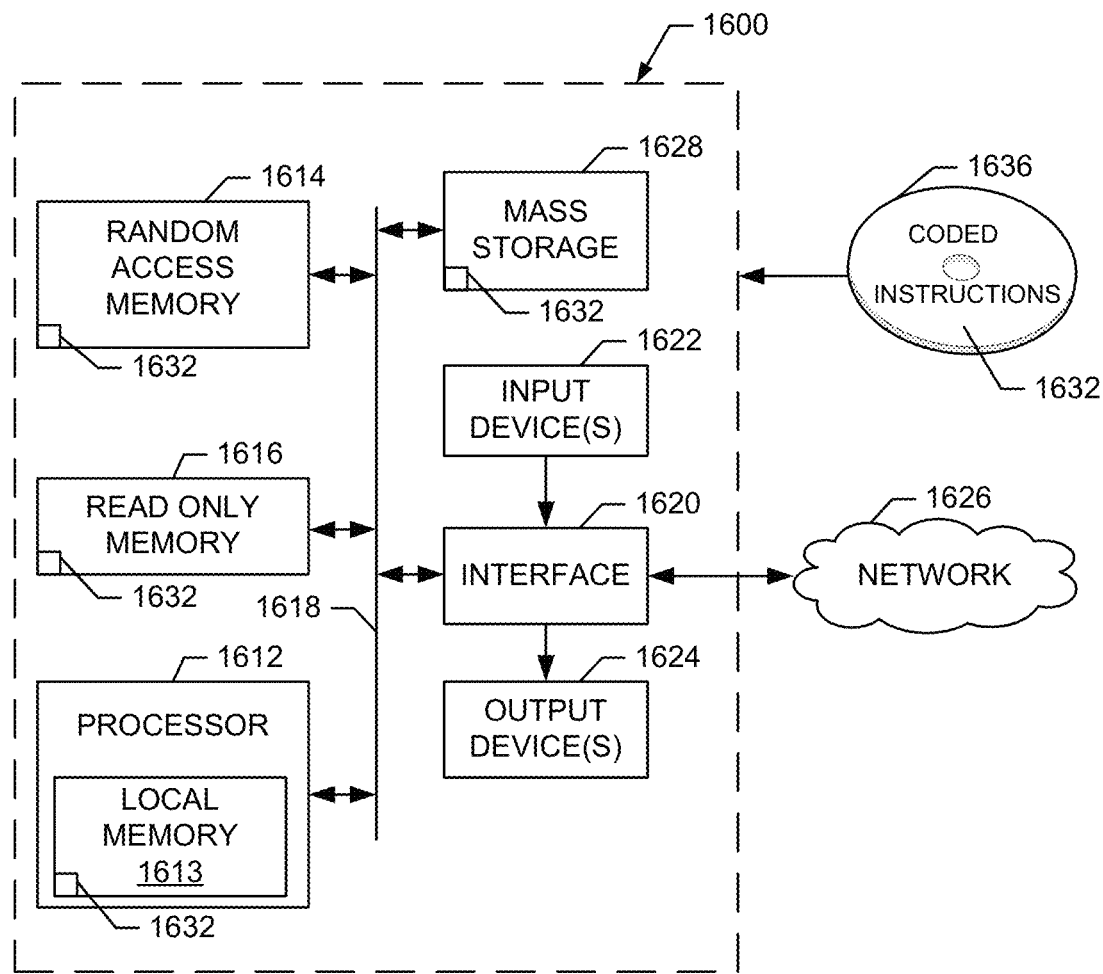
FIG. 16 is a block diagram of an example processor platform that may execute example machine readable instructions used to implement some or all of the processes of FIGS. 11-14 and/or 15 to implement the example eNB, the example small cell node and/or the example UE of FIG. 10.

FIG. 16 is a block diagram of an example processor platform 1600 capable of executing the processes of FIGS. 11-15 to implement the example mobile network 100, the example macro eNB 105, the example UEs 110, 115 and/or 210, the example small cell node(s) 120, the example small cell cluster 305, the example communication links 505, the example channel quality processor 1005, the example cluster definer 1010, the example MCS specifier 1015, the example cluster retransmission type specifier 1020, the example cluster retransmission resource allocator 1025, the data acknowledger 1030, the example channel quality reporter 1035, the example UE channel state determined 1040, the example cluster configurer 1045, the example beamformer 1050, the example data retransmitter 1055, the example channel quality reporter 1060, the example cluster assigner 1065, the example cluster communication processor 1070 and/or the example data acknowledger 1075 of FIGS. 1-10. The processor platform 1600 can be, for example, a server, a personal computer, a mobile device (e.g., a cell phone, a smart phone, a tablet, etc.), a personal digital assistant (PDA), an Internet appliance, a DVD player, a CD player, a digital video recorder, a Blu-ray player, a gaming console, a personal video recorder, a set top box a digital camera, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors or controllers from any desired family or manufacturer.

The processor 1612 of the illustrated example includes a local memory 1613 (e.g., a cache) (e.g., a cache). The processor 1612 of the illustrated example is in communication with a main memory including a volatile memory 1614 and a non-volatile memory 1616 via a link 1618. The link 1618 may be implemented by a bus, one or more point-to-point connections, etc., or a combination thereof. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit(s) a user to enter data and commands into the processor 1612. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1620 of the illustrated example, thus, typically includes a graphics driver card, a graphics driver chip or a graphics driver processor.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.).

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, RAID (redundant array of independent disks) systems, and digital versatile disk (DVD) drives.

Coded instructions 1632 corresponding to the instructions of FIGS. 11-15 may be stored in the mass storage device 1628, in the volatile memory 1614, in the non-volatile memory 1616, in the local memory 1613 and/or on a removable tangible computer readable storage medium, such as a CD or DVD 1636.

Also, as used herein, the term "node" broadly refers to any connection point, such as a redistribution point or a communication endpoint, of a communication environment, such as a network. Accordingly, such nodes can refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, digital subscriber line (DSL) modems, wireless LAN (WLAN) access points, etc. Examples of Internet or Intranet nodes include host computers identified by an Internet Protocol (IP) address, bridges, WLAN access points, etc. Likewise, examples of nodes in cellular communication include base stations, relays, base station controllers, radio network controllers, home location registers, Gateway GPRS Support Nodes (GGSN), Serving GPRS Support Nodes (SGSN), Serving Gateways (S-GW), Packet Data Network Gateways (PDN-GW), etc.

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or conversely, to devices that have similar capabilities that are not generally transportable, such as desktop computers, set-top boxes, sensors, etc. A server node, as used herein, may refer to an information processing device (e.g., a host computer), or series of information processing devices, that perform information processing requests submitted by other nodes. As used herein, a peer node may sometimes serve as a client node, and at other times, a server node. In a peer-to-peer or overlay network, a node that actively routes data for other networked devices as well as itself may be referred to as a supernode. An access node, as used herein, may refer to a node that provides a client node access to a communication environment. Examples of access nodes include, but are not limited to, cellular network base stations such as evolved Node-Bs (eNBs), wireless broadband (e.g., WiFi, WiMAX, etc) access points, relay nodes, cluster head devices, mobile stations, etc., which provide corresponding cell and/or WLAN coverage areas, etc.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for a macro node in a mobile network, the method comprising:
    configuring a cluster of small cell nodes in communication with the macro node to perform retransmission of downlink packets sent from the macro node to a first user equipment (UE) served by the macro node, wherein each small cell node in the cluster is deployed within a coverage area of the macro node;
    determining, by the macro node, a first channel quality metric characterizing channel quality between a first small cell node and the first UE based on first channel quality information received from the UE;
    determining, by the macro node, whether to include the first small cell node in the cluster of small cell nodes based on comparing the first channel quality metric to a first threshold;
    sending a first downlink packet from the macro node for receipt by the first UE; and
    receiving, at the macro node, acknowledgment information for the first downlink packet from the cluster of small cell nodes, wherein the acknowledgment information indicates whether the first downlink packet is received by the first UE.

2. A method as defined in claim 1, further comprising:
    determining a second channel quality metric characterizing channel quality between the macro node and the first small cell nodebased on second channel quality information received from the first small cell node; and
    wherein whether to include the first small cell node in the cluster of small cell nodes is determined further based on
    comparing the second channel quality metric to a second threshold.

3. A method as defined in claim 1, further comprising, in response to receiving a negative acknowledgment for the first downlink packet from the first UE, scheduling the cluster of small cell nodes to retransmit the first downlink packet to the first UE.

4. A method as defined in claim 1, further comprising:
    determining second channel quality metrics characterizing channel quality between the macro node and respective ones of the cluster of small cell nodes based on second channel quality information received from the cluster of small cell nodes;
    determining third channel quality metrics characterizing channel quality between respective ones of the cluster of small cell nodes and the first UE based on third channel quality information received from the UE; and
    based on the second channel quality metrics and the third channel quality metrics, (1) selecting a first modulation and coding scheme (MCS) for downlink communication from the macro node to the cluster of small cell nodes, and (2) selecting a second MCS for downlink communication from the cluster of small cell nodes to the first UE.

5. A method as defined in claim 4, wherein selecting the first MCS for downlink communication from the macro node to the cluster of small cell nodes is further based on:
    using the second channel quality metrics to determine a probability that a first number of small cell nodes will receive downlink packets sent from the macro node using the first MCS; and
    selecting the first MCS for downlink communication from the macro node to the cluster of small cell nodes in response to determining that the probability at least meets a threshold.

6. A method as defined in claim 1, wherein configuring the cluster of small cell nodes comprises:
    determining a channel condition associated with the first UE; and
    specifying, based on the channel condition, whether the cluster of small cell nodes is to perform distributed beamforming retransmission of the downlink packets or single frequency network retransmission of the downlink packets.

7. A method as defined in claim 1, wherein the cluster is a first cluster, and further comprising:
    configuring a second cluster of small cell nodes in communication with the macro node to perform retransmission of uplink packets sent from the first UE to the macro node;
    in response to determining that a first uplink packet sent from the first UE for receipt by the macro node has not been received, sending a negative acknowledgment for the first uplink packet to the second cluster of small cell nodes; and
    receiving the first uplink packet from the second cluster of small cell nodes.

8. A method as defined in 7, further comprising:
    determining a second channel quality metric characterizing channel quality between the first UE and a second small cell nodes based on second channel quality information received from the second small cell nodes; and
    determining whether to include the second small cell nodes in the second cluster of small cell nodes based on comparing the second channel quality metric to a second threshold.

9. A method as defined in 7, further comprising configuring the first UE to send the uplink data packets, including the first uplink data packet, to the second cluster of small cell nodes.

10. A method as defined in 9, further comprising:
determining a power control offset to be used by the first UE when sending the first uplink packet to the second cluster of small cell nodes; and
sending the power control offset to the first UE.

11. A method for a small cell node in a mobile network, the method comprising:
receiving information to configure the small cell node to perform retransmission of downlink packets sent from a macro node in the mobile network to a first user equipment (UE) served by the macro node, wherein the small cell node is selected by the macro node based on channel quality information received from the first UE and the small cell node is included in a cluster of small cell nodes that are deployed within a coverage area of the macro node;
detecting, by the small cell node, a first downlink packet sent from the macro node for receipt by the first UE;
in response to receiving a negative acknowledgment for the first downlink packet from the first UE, retransmitting, by the small cell node, the first downlink packet to the first UE; and
sending, by the small cell node, acknowledgment information for the first downlink packet to the macro node, wherein the acknowledgment information indicates whether the first downlink packet is received by the first UE.

12. A method as defined in claim 11, further comprising receiving second information from the macro node to schedule retransmission of the first downlink packet to the first UE.

13. A method as defined in claim 11, wherein the small cell node is to retransmit the first downlink packet to the first UE without being scheduled by the macro node.

14. A method as defined in claim 11, further comprising:
receiving a positive acknowledgment for the first downlink packet from the first UE in response to retransmitting the first downlink packet to the first UE; and
sending the positive acknowledgment to the macro node.

15. A method as defined in claim 11, further comprising:
determining a channel condition associated with the first UE; and
determining, based on the channel condition, a beamforming weight to be used when retransmitting the first downlink packet to the first UE.

16. A method as defined in claim 11, wherein the information is first information, and further comprising:
receiving second information to configure the small cell node to perform retransmission of uplink packets sent from the first UE to the macro node;
detecting a first uplink packet sent by the first UE to the macro node; and
in response to receiving a negative acknowledgment for the first uplink packet from the macro node, retransmitting the first uplink packet to the macro node.

17. A method as defined in claim 16, further comprising sending a first positive acknowledgment for the first uplink packet to the first UE in response to detecting the first uplink packet and before receiving a second positive acknowledgment for the first uplink packet from the macro node.

18. A method for a user equipment (UE) in a mobile network, the method comprising:
receiving information from a macro node specifying a cluster of small cell nodes to perform retransmission of downlink packets sent from the macro node to the UE, wherein the cluster of small cell nodes are configured based on channel quality information received from the UE, each small cell node in the cluster is deployed within a coverage area of the macro node;
in response to determining that a first downlink packet sent from the macro node directly to the UE has not been received, sending, by the UE, a negative acknowledgment for the first downlink packet to the cluster of small cell nodes; and
receiving, by the UE, the first downlink packet from the cluster of small cell nodes.

19. A method as defined in claim 18, further comprising, in response to receiving the first downlink packet from the cluster of small cell nodes, sending a positive acknowledgment for the first downlink packet to the cluster of small cell nodes.

20. A method as defined in claim 18, wherein the information is first information and the cluster is a first cluster, and further comprising
receiving second information from the macro node specifying a second cluster of small cell nodes to perform retransmission of uplink packets sent from the UE to the macro node;
sending a first uplink packet from the UE to the macro node; and
receiving acknowledgment information for the first uplink packet from the cluster of small cell nodes.

21. A method as defined in claim 20, further comprising receiving third information to configure the UE to send the uplink data packets, including the first uplink data packet, to the second cluster of small cell nodes.

22. A method as defined in claim 21, further comprising receiving a power control offset to be used when sending the first uplink packet to the second cluster of small cell nodes.

* * * * *

UNITED STATES PATENT AND TRADEMARK OFFICE
CERTIFICATE OF CORRECTION

PATENT NO.       : 9,461,800 B2
APPLICATION NO.  : 14/038481
DATED            : October 4, 2016
INVENTOR(S)      : Vrzio et al.

It is certified that error appears in the above-identified patent and that said Letters Patent is hereby corrected as shown below:

In the Claims

Column 34, Line 54, Claim 8, after "in" insert -- claim --.

Column 34, Line 64, Claim 9, after "in" insert -- claim --.

Column 35, Line 1, Claim 10, after "in" insert -- claim --.

Signed and Sealed this
Third Day of January, 2017

Michelle K. Lee
*Director of the United States Patent and Trademark Office*